US006384834B1

(12) United States Patent
Watanabe

(10) Patent No.: US 6,384,834 B1
(45) Date of Patent: *May 7, 2002

(54) THREE-DIMENSIONAL SIMULATOR APPARATUS AND IMAGE SYNTHESIS METHOD USING TEXTURE COMPUTATION AND TEXTURE INFORMATION STORAGE

(75) Inventor: Hiroyuki Watanabe, Yokohama (JP)

(73) Assignee: Namco Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/632,463

(22) PCT Filed: Aug. 16, 1995

(86) PCT No.: PCT/JP95/01628

§ 371 Date: Apr. 22, 1996

§ 102(e) Date: Apr. 22, 1996

(87) PCT Pub. No.: WO96/06410

PCT Pub. Date: Feb. 29, 1996

(30) Foreign Application Priority Data

Aug. 22, 1994 (JP) ............................................. 6-219418

(51) Int. Cl.[7] ................................................ G06T 11/40

(52) U.S. Cl. ........................ 345/582; 345/581; 382/285

(58) Field of Search ................................. 395/129, 130; 345/429, 430, 425, 581, 582; 463/31, 40; 434/62–70; 382/285

(56) References Cited

U.S. PATENT DOCUMENTS 4,615,013 A * 9/1986 Yan et al. .................... 345/430
5,222,205 A * 6/1993 Larson et al. ............... 345/430
5,261,041 A * 11/1993 Susman .................. 345/430 X
5,333,245 A * 7/1994 Vecchione .................. 345/430
5,537,224 A * 7/1996 Suzuoki et al. ............. 345/340
5,550,960 A * 8/1996 Shriman et al. ............ 345/340
5,561,745 A * 10/1996 Jackson et al. ............. 345/419
5,561,746 A * 10/1996 Murata et al. .............. 345/419
5,577,960 A * 11/1996 Sasaki ......................... 463/32
5,615,322 A 3/1997 Murata et al.
5,630,043 A * 5/1997 Uhlin ......................... 345/474
5,696,892 A * 12/1997 Redmann et al. ........... 345/425

FOREIGN PATENT DOCUMENTS

JP 1-131976 A 5/1989
JP 1-131976 * 5/1989
JP 6-103385 4/1994
JP 06-223199 12/1994

OTHER PUBLICATIONS

"Visualization for Climate Modeling": Nelson Max et al; IEEE Computer Graphics & Application, 0272–17–16/93/0700–/0034.*

Korein et al., "Temporal Anti–Aliasing in Computer Generated Animation," Computer Graphics, vol. 17, No. 3, pp. 377–388, 1983.*

Pixel, Oct. 1993; p. 41, picture 4.

* cited by examiner

*Primary Examiner*—Mark Zimmerman
*Assistant Examiner*—Mano Padmanabhan
(74) *Attorney, Agent, or Firm*—Oliff & Berridge, PLC

(57) ABSTRACT

The present invention provides a three-dimensional simulator apparatus and image synthesis method which may realistically simulate the real world when the velocity and/or rotational velocity of a display object has changed or when the surface state of that display object is to change in accordance with simulation circumstances. An image synthesis section (200) contains a texture computation section (230) for performing computations to map textures onto the display objects and a texture information storage section (242) for storing information of the textures to be mapped. Different types of texture information is stored in the texture information storage section (242) for the same display object. Either the type of information of the texture to be mapped onto the display object or information specifying that type is changed in accordance to the velocity and/or rotational velocity of the display object, or with the surface state of the display object which surface state changes with simulation circumstances. This enables an increase in realism of the simulation.

20 Claims, 21 Drawing Sheets

STATIC STATE
34 LETTERING
36 WHEEL PATTERN
38 SHAFT NUT

HIGH-SPEED ROTATIONAL STATE
40 LETTERING
42 WHEEL PATTERN
44 SHAFT NUT

100 VIRTUAL 3D SPACE COMPUTATION
12
CONTROL
108
OBJECT INFORMATION STORAGE
104
VIRTUAL 3D SPACE SETTING
MAP SETTING
110
106
MOVEMENT INFORMATION COMPUTATION
102
PROCESSING
210
IMAGE SUPPLY
OBJECT IMAGE INFORMA-TION STORAGE
212
228
IMAGE FORMING
10
DIS-PLAY
200 IMAGE SYNTHESIS

FIG. 7

| OBJECT NUMBER | POSITION INFORMATION | | | ORIENTATION INFORMATION | | |
|---|---|---|---|---|---|---|
| $OB_0$ | $X_0$ | $Y_0$ | $Z_0$ | $\theta_0$ | $\phi_0$ | $\rho_0$ |
| $OB_1$ | $X_1$ | $Y_1$ | $Z_1$ | $\theta_1$ | $\phi_1$ | $\rho_1$ |
| $OB_2$ | $X_2$ | $Y_2$ | $Z_2$ | $\theta_2$ | $\phi_2$ | $\rho_2$ |
| $OB_3$ | $X_3$ | $Y_3$ | $Z_3$ | $\theta_3$ | $\phi_3$ | $\rho_3$ |
| $OB_4$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| $OB_{i-2}$ | $X_{m-2}$ | $Y_{m-2}$ | $Z_{m-2}$ | $\theta_{m-2}$ | $\phi_{m-2}$ | $\rho_{m-2}$ |
| $OB_{i-1}$ | $X_{m-1}$ | $Y_{m-1}$ | $Z_{m-1}$ | $\theta_{m-1}$ | $\phi_{m-1}$ | $\rho_{m-1}$ |
| $OB_i$ | $X_m$ | $Y_m$ | $Z_m$ | $\theta_m$ | $\phi_m$ | $\rho_m$ |

FIG. 9 (Con't)
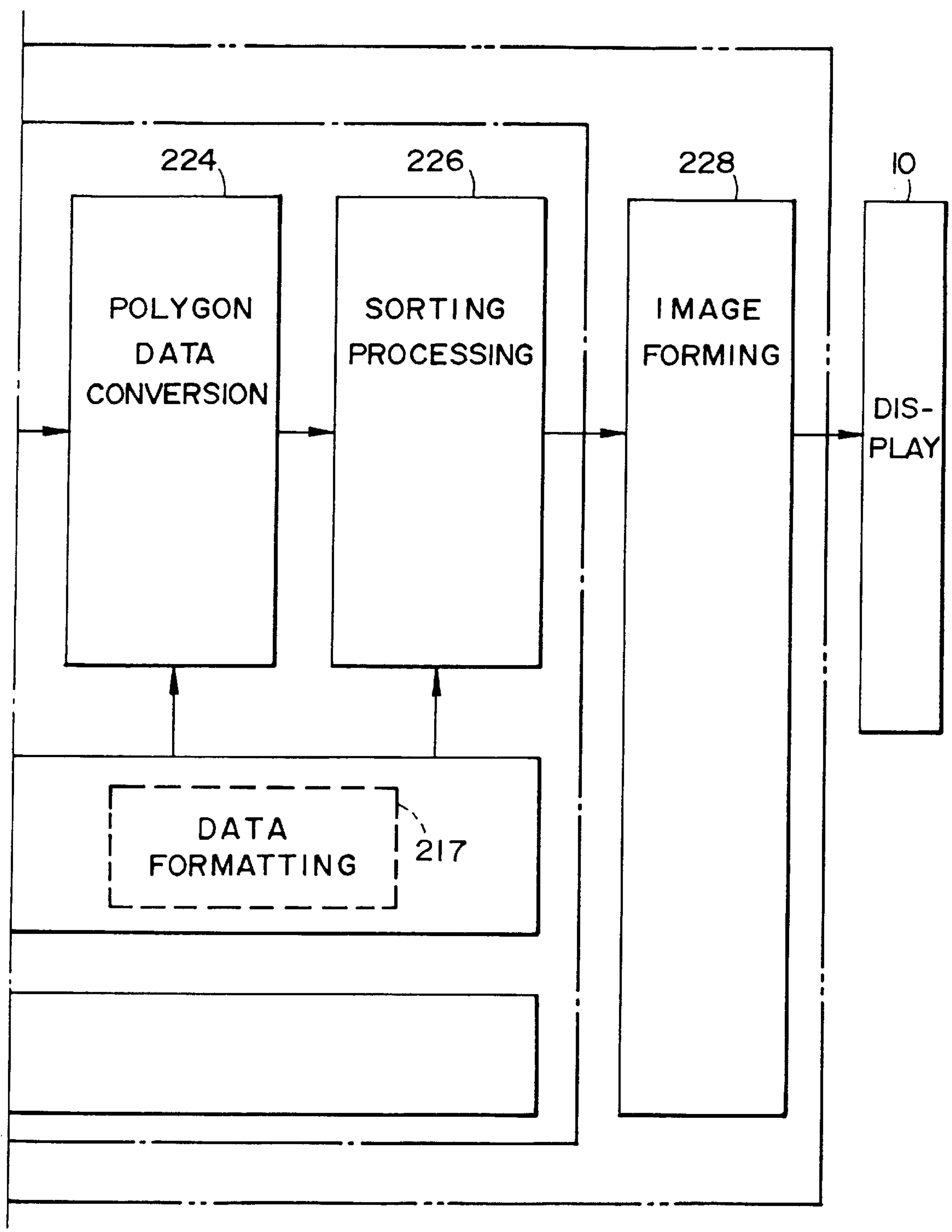

200 IMAGE SYNTHESIS
12
CONTROL
100
VIRTUAL 3D SPACE COMPUTATION
102
PROCESSING
210
IMAGE SUPPLY
212
OBJECT IMAGE INFORMATION STORAGE
228 IMAGE FORMING
230
TEXTURE COMPUTATION
242
TEXTURE INFORMATION STORAGE
244
PALETTE AND MIXER
10
DISPLAY 332
306
302
304
B
332
(12)
(21)
(18)
(22)
(19)
(20)
(1)
(2)
(5)
(3)
(6)
(4)
(33)
(34)
(35)
(36)
(37)
(38)
(39)
(40)
C
(VXO, VYO, VZO, VTXO, VTYO, VBRIO)
(VXI, VYI, VZI, VTXI, VTYI, VBRII)
A
(VX2, VY2, VZ2, VTX2, VTY2, VBRI2)
(VX3, VY3, VZ3,
VTX3, VTY3, VBRI3)

ROM PLANE
PERSPECTIVE PROJECTION CONVERSION
PERSPECTIVE PROJECTION CONVERSION
48
INCREMENTATION
INCRE-MENTA-TION
INVERSE PER-SPECTIVE PRO-JECTION CON-VERSION
(J) ROM PLANE
COLOR CODE
SCREEN

FIG. 18A STATIC STATE
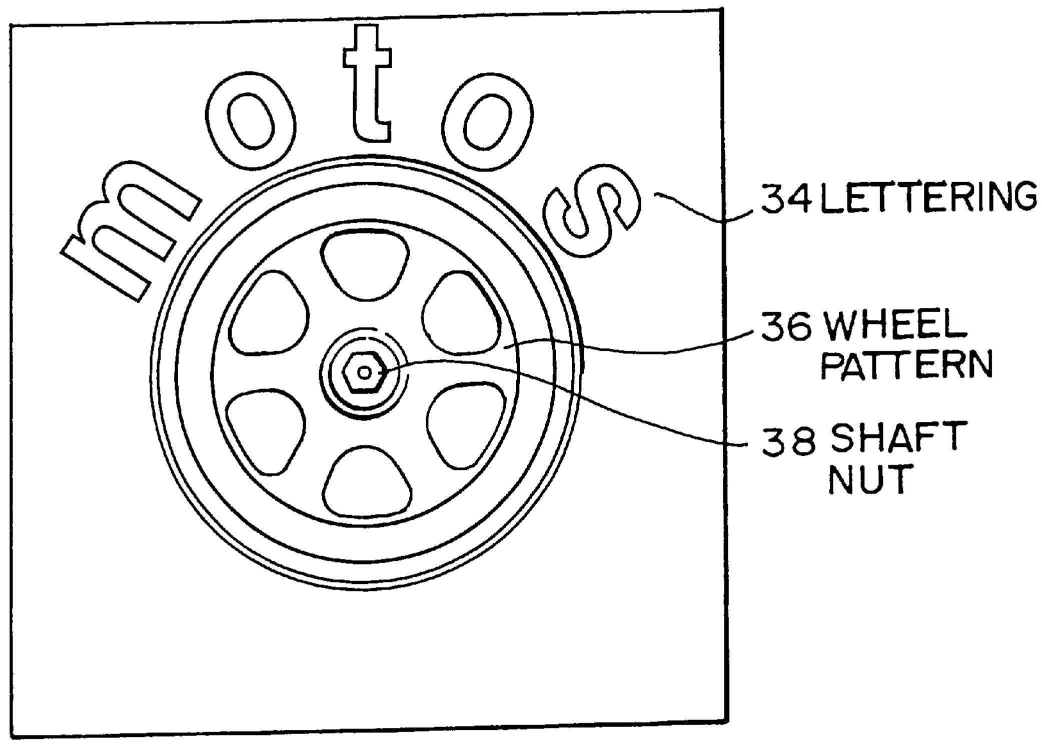
FIG. 18B HIGH-SPEED ROTATIONAL STATE
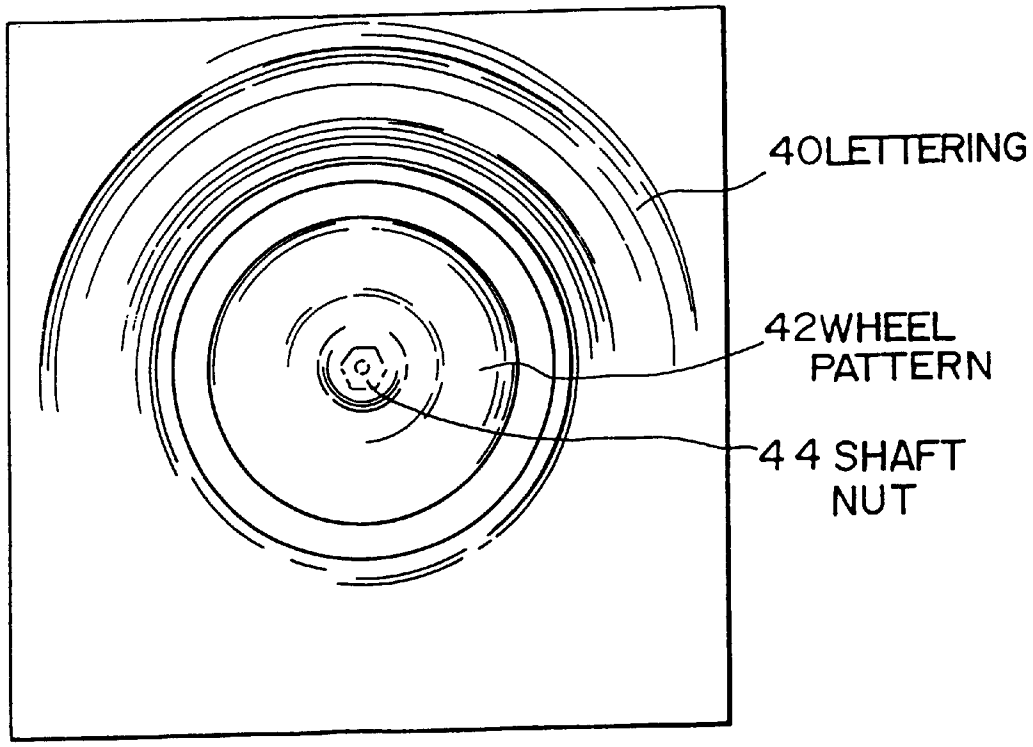

ORDINARY ROAD SURFACE

GRAVEL ROAD AREA

GRAVEL ROAD AREA

THREE-DIMENSIONAL SIMULATOR APPARATUS AND IMAGE SYNTHESIS METHOD USING TEXTURE COMPUTATION AND TEXTURE INFORMATION STORAGE

TECHNICAL FIELD

The present invention relates to a three-dimensional simulator apparatus and an image synthesis method capable of simulating a virtual three-dimensional (3D) space.

BACKGROUND OF ART

Various types of three-dimensional (3D) simulator apparatus that are used in applications such as 3D games and piloting simulators for aircraft or other vehicles are known in the art. With such a 3D simulator apparatus, image information relating to a 3D object 300 shown in FIG. 20A is previously stored within the apparatus. This 3D object 300 depicts an element such as scenery that can be seen by a player (observer) 302 as if through a screen 306. This display object is displayed as a pseudo-3D image (projected image) 308 on the screen 306, by perspective projection conversion on the screen 306 of the image information of the 3D object 300. When the player 302 specifies an operation such as rotation or forward motion through a control panel 304, this apparatus performs predetermined 3D computation processing on the basis of the resultant operating signals. More specifically, computations are first performed to determine whether a change has occurred, such as a change in the viewpoint and where the eyes of the player 302 are directed or a change in the position and orientation of a vehicle in which the player 302 is sitting, as specified by these operating signals. Computations are then performed to determine how the image of the 3D object 300 can be seen on the screen 306, in accordance with this change such as a change in viewpoint and where the player's eyes are directed. The above computations are performed in real time, following the actions of the player 302. This makes it possible for the player 302 to see any change in the scenery, due to a change in the player's own viewpoint or where the player's eyes are directed or a change in the position or orientation of the vehicle in which the player is sitting, as a pseudo-3D image in real time, to simulate the experience of a virtual 3D space.

An example of a displayed image formed by a 3D simulator apparatus as described above is shown in FIG. 20B.

In a 3D simulator apparatus of this type, each display object is represented by assembling a large number of polygons. Taking a tire in a racing car game by way of example, each of a side surface and a running surface of the tire is configured of an assembly of a plurality of polygons. A method called texture mapping is also used, to increase the quality of the image to be displayed. This texture mapping method applies a texture onto a polygon configuring the display object to achieve a more realistic displayed image. With this tire as an example, a texture that represents lettering and a wheel (spoke) pattern is mapped onto the side surface of the tire. Similarly, a texture that represents the tread surface of the tire is mapped onto the running surface thereof. In the prior art, only one type of texture can be provided for each display object.

However, a problem occurs with the example of mapping the texture of lettering on the side surface of a tire, as described below. That is, in the real world simulated by this 3D simulator apparatus, the lettering ought to flow in the direction of rotation of the tire as the tire rotates, and the outlines of this lettering ought to start to blur as the rotation increases. Even if the 3D simulator apparatus were to attempt to simulate this phenomenon, however, it has been shown that the outlines of the lettering will not blur. The reason for this relates to the processing speed of the 3D simulator apparatus and is caused by the fact that an image is generated once every 1/60 second, for example, unlike in the real world. Therefore, there is a problem that it is not possible to realistically simulate the blurring of the outlines of the lettering that would occur in the real world, by simply applying the texture of lettering to the side surface of the tire and rotating the tire at high speed.

A further problem occurs with the example of mapping the texture of a tread surface onto the running surface of the tire, as described below. In other words, if a racing car should leave the course and run onto another surface such as a gravel road, because of a driving error, gravel or sand would adhere to the running surface of the tire in the real world and the state of the running surface of the tire ought to change accordingly. With a prior-art 3D simulator apparatus, however, only one texture can be provided for each display object. This causes a problem in that it is not possible to represent such a change in the state of the running surface of the tire, and thus a phenomenon that occurs in the real world cannot be simulated realistically.

The present invention has been devised in the light of the above described technical problems and has as its objective the provision of a 3D simulator apparatus and an image synthesis method that can simulate the real world realistically, even when the velocity and/or rotational velocity of a display object has changed.

Another objective of the present invention is to provide a 3D simulator apparatus and an image synthesis method that can simulate the real world realistically, even when the surface state of a display object is to change in accordance with simulation circumstances.

DISCLOSURE OF THE INVENTION

In order to solve the above described problems, a first aspect of the present invention concerns a three-dimensional simulator apparatus for synthesizing a field-of-view image as seen from an observer within a virtual three-dimensional (3D) space configured of a plurality of display objects, comprising:

texture computation means for performing computations to map textures onto the display objects;

texture information storage means for storing information of the textures to be mapped by the texture computation means, the texture information storage means for storing different types of texture information corresponding to the same display object; and modification means for modifying one of the type of information of at least one texture to be mapped onto at least one display object, and information specifying the type, in accordance with at least one of the velocity and rotational velocity of the at least one display object.

With this aspect of the invention, a plurality of types of texture information is stored for mapping onto a display object, such as a side surface of a tire. For example, texture information for a halted state and texture information for high-speed rotational state (or high-speed running state) are stored. Either the type of texture information for the mapping onto the side surface of the tire, or information specifying the type, is changed in a manner consistent with a factor such as the rotational velocity of the tire. Thus lettering with clear outlines can be represented on the side surface tire when the tire is in a halted state, and lettering with blurred outlines can be represented thereon when the tire is in a high-speed rotational state. In this case, the means for modifying the type of texture information may be included within means for forming the virtual 3D space, for example, or means for sythesizing the field-of-view image. Alternatively, such means may be provided separately in both places. This invention includes a configuration in which the type of the texture information is changed in accordance with the relative velocity or relative rotational velocity between the obsever and the display object.

A second aspect of the present invention concerns a three-dimensional simulator apparatus, comprising: means for storing object information that comprises at least object numbers and position information for display objects configuring a virtual three-dimensional (3D) space; virtual 3D space computation means for forming the virtual 3D space by setting the object information; object image information storage means for storing image information of objects specified by the object number; and image synthesis means for synthesizing a field-of-view image as seen from an observer based on the object information and the image information read out in accordance with the object numbers included in the object information;

wherein the image synthesis means comprises:

texture computation means for performing computations to map textures onto the display objects, and texture information storage means for storing information of the textures to be mapped by the texture computation means, the texture information storage means for storing different types of texture information corresponding to the same display object;

the virtual 3D space computation means comprises:

modification means for modifying at least one object number in accordance with at least one of the velocity and rotational velocity of at least one display object specified by the at least one object number; and the object image information storage means stores the image information wherein information of a texture to be mapped onto an object that is specified by a pre-modification object number is different from information of a texture to be mapped onto an object that is specified by a post-modification object number.

With this aspect of the invention, an object number used for specifying a display object such as a tire object is changed in a manner consistent with a factor such as the rotational velocity of the tire. The object number is changed in such a manner that a tire object for a halted state is specified when the tire is in a halted state, and a tire object for a high-speed rotational state is specified when the tire is rotating at high speed. Corresponding image information of the object is read from the object image information storage means in accordance with the thus changed object number. In this case, the configuration is such that image information for a tire object in the halted state reads out texture information for the halted state, and image information for the tire object in a high-speed rotational state reads out texture information for the high-speed rotational state. This makes it possible to change the texture coordinates (information specifying texture information) within the image information.

In a third aspect of the present invention, the modification means performs the modification in steps in accordance with at least one of the velocity and rotational velocity of the at least one display object.

With this aspect of the invention, when the display object is a tire, for example, the information of the textures to be mapped can be changed in steps to include not only textures for a halted state and a high-speed rotational state, but also for a low-speed rotational state and an intermediate-speed rotational state.

A fourth aspect of the present invention concerns a three-dimensional simulator apparatus for synthesizing a field-of-view image as seen from an observer within a virtual three-dimensional (3D) space configured of a plurality of display objects, comprising:

texture computation means for performing computations to map textures onto the display objects;

texture information storage means for storing information of the textures to be mapped by the texture computation means, the texture information storage means for storing different types of texture information corresponding to the same display object; and modification means for modifying one of the type of information of at least one texture to be mapped onto at least one display object, and information specifying the type, in accordance with a surface state of the at least one display object, the surface state being changed with simulation circumstances.

With this aspect of the invention, a plurality of types of texture information is stored for mapping onto a display object, such as the running surface of a tire. Texture information for an ordinary road surface and that for a gravel road area may be stored, for example. Either the type of information of the texture to be mapped onto the running surface of the tire or information specifying that type can be changed in a manner consistent with a factor such as the running speed of the racing car. This makes it possible to use a normal state to represent the running surface of the tire when the racing car is running along an ordinary road surface, and a state in which gravel or sand is adhering to the running surface of the tire when the racing car has entered a gravel road area. The means for modifying the type of texture information can be located anywhere within the apparatus in this case.

A fifth aspect of the present invention concerns a three-dimensional simulator apparatus, comprising: means for storing object information that comprises at least object numbers and position information for display objects configuring a virtual three-dimensional (3D) space; virtual 3D space computation means for forming said virtual 3D space by setting the object information; object image information storage means for storing image information of objects specified by the object numbers; and image synthesis means for synthesizing a field-of-view image as seen from an observer based on the object information and the image information read out in accordance with the object numbers included in the object information;

wherein the image synthesis means comprises:

texture computation means for performing computations to map textures onto said display objects; texture information storage means for storing information of the textures to be mapped by the texture computation means, the texture information storage means for storing different types of texture information corresponding to the same display object;

the virtual 3D space computation means comprises:

modification means for modifying at least one object number in accordance with a surface state of at least one display object specified by the at least one object number, the surface state being changed with simulation circumstances; and the object image information storage means stores the image information wherein information of a texture to be mapped onto an object that is specified by a pre-modification object number is different from information of a texture to be mapped onto an object that is specified by a post-modification object number.

With this aspect of the invention, the object number used for specifying the tire object can be changed in a manner consistent with a change in a display object, such as the surface of the tire, caused by the circumstances of the simulation. The object number may be changed to specify that a tire object corresponding to travel along an ordinary road surface is specified when the racing car is running along an ordinary road surface, and a tire object corresponding to travel along a gravel road area is specified when running along a gravel road area, for example. The corresponding image information of the object is read out from the object image information storage means in accordance with the changed object number. In this case, the configuration is such that texture information representing an ordinary tread surface is read out as image information for the tire object for running along the ordinary road surface, and texture information representing a tread surface to which gravel or sand is adhering is read out as image information for the tire object for running along the gravel road area.

In a sixth aspect of the present invention, the modification means performs the modification in steps in accordance with a surface state of the at least one display object.

With this aspect of the invention, if the display object is a tire, for example, the type of texture information onto the display object can be changed in steps in a manner consistent with a factor such as the distance travelled along the gravel road area. This makes it possible to represent a state in which more gravel and sand adheres to the tire as the distance traveled increases.

BRIEF DESCRIPTION OF DRAWINGS

FIG. 7 is a schematic view illustrating display object information that is stored in the object image information storage section;

FIGS. 18A and 18B show examples of texture information mapped onto the side surface of a tire;

BEST MODE FOR CARRYING OUT THE INVENTION

1. Outline of Game

An example of a three-dimensional (3D) game enabled by the 3D simulator apparatus of the present invention will first be briefly described.

Figure 2:
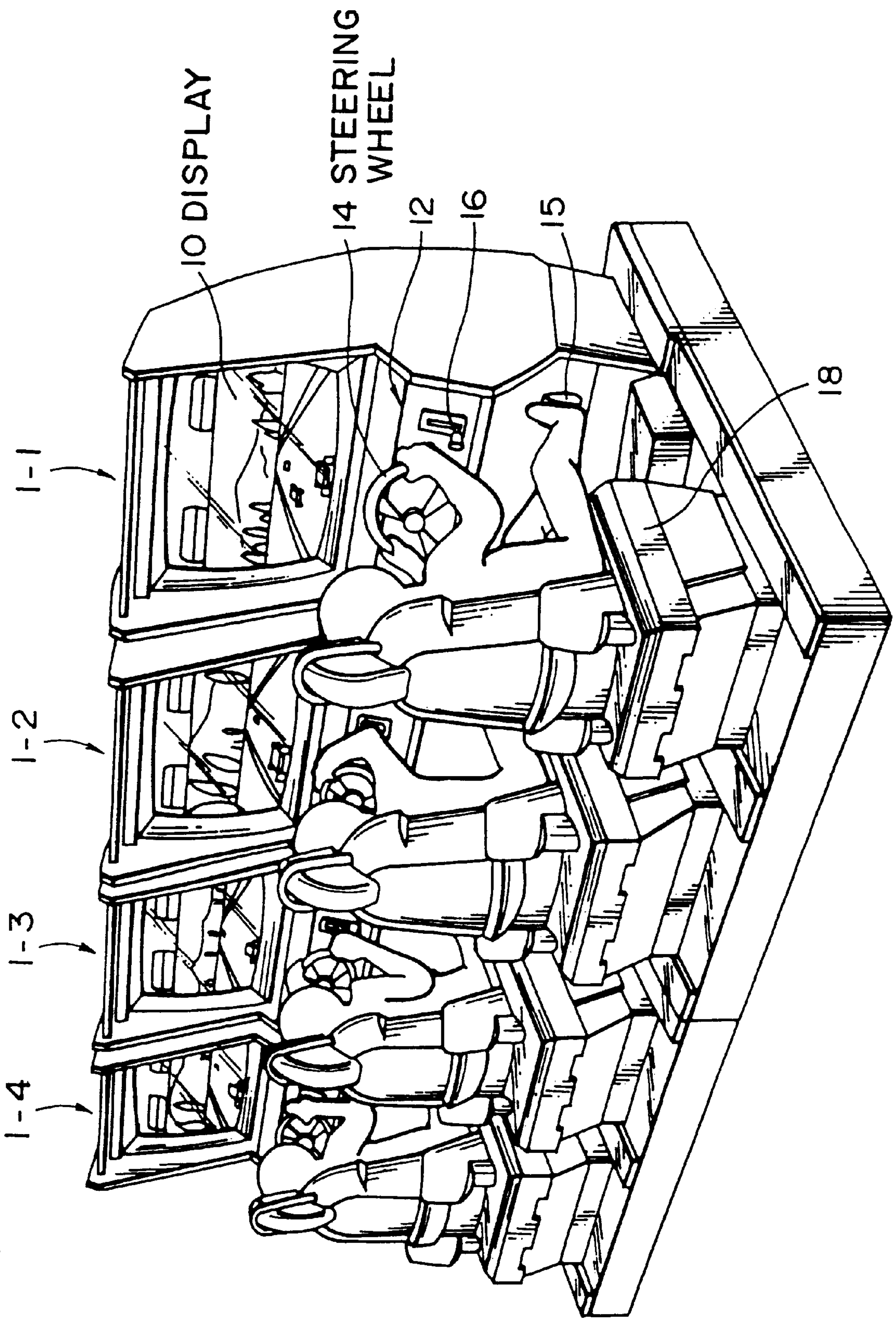
FIG. 2 shows an example of the exterior of the present three-dimensional simulator apparatus.

An example of this 3D simulator apparatus is shown in FIG. 2. In the 3D simulator apparatus of FIG. 2, a plurality of independent simulator apparatuses (games machines) 1-1, 1-2, 1-3, and 1-4 are connected together by data transfer lines. This makes it possible for a racing car driven by a player to compete against other racing cars driven by other players or computer-operated cars operated by a computer.

In this case, each of independent simulator apparatuses 1-1, 1-2, 1-3, and 1-4 is configured in such a manner that it can be used independently to provide a single-player game. Of course, they can also be configured to allow a multi-player game in which opposing players compete within the same game space, via the data transfer lines.

Each of the simulator apparatuses shown in FIG. 2 is modeled in the same manner as the driving seat of a real racing car. The game is such that a player sits in a seat 18 and operates controls such as a steering wheel 14, an accelerator pedal 15, and a shift lever 16 provided on a control section 12, while watching a game scene (a pseudo-3D image of the surroundings as seen from the driving seat of a racing car) that is projected on a display 10.

Note that the 3D simulator apparatuses shown in FIG. 2 are configured for a multi-player game but the present invention is not limited thereto; it can equally well be applied to a single-player configuration.

Figure 3:
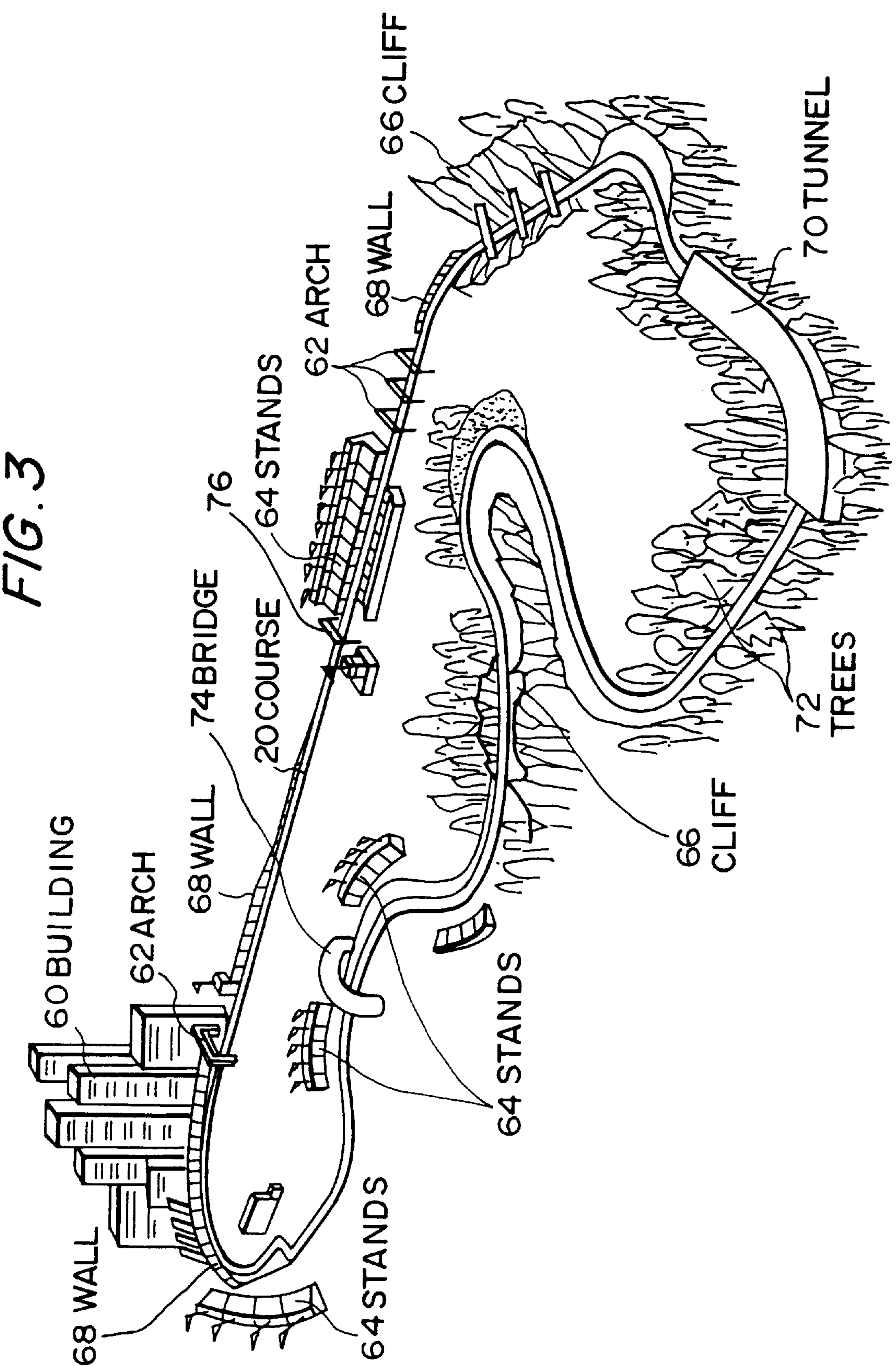
FIG. 3 shows an example of a virtual three-dimensional (3D) space provided within this 3D game.

An example of the virtual 3D space displayed in this 3D game is shown in FIG. 3. This shows how a course 20 that is formed in a three-dimensional manner is laid out within the virtual 3D space of the 3D game. Various 3D objects such as buildings 60, arches 62, stands 64, cliffs 66, walls 68, a tunnel 70, trees 72, and a bridge 74 are laid out around the periphery of this course 20. The player operates the racing car while viewing the display 10 where this course and the other 3D objects are projected. The player starts from a starting line 76, drives around the course 20 a predetermined number of times until he or she reaches a finishing line, and thus the player's ranking is determined.

Figure 4:
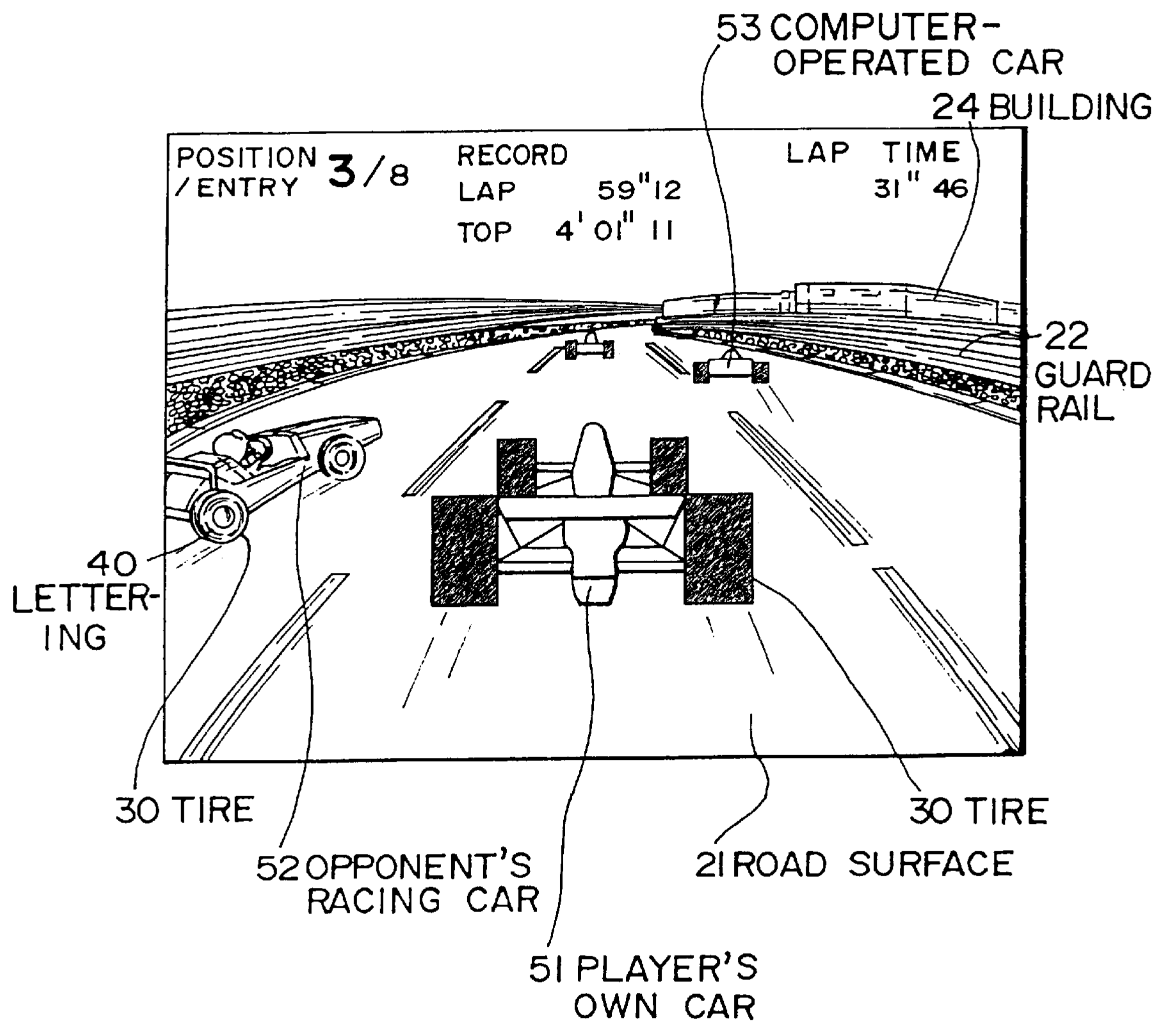
FIG. 4 shows an example of a game scene synthesized by the present three-dimensional simulator apparatus.
Figure 5:
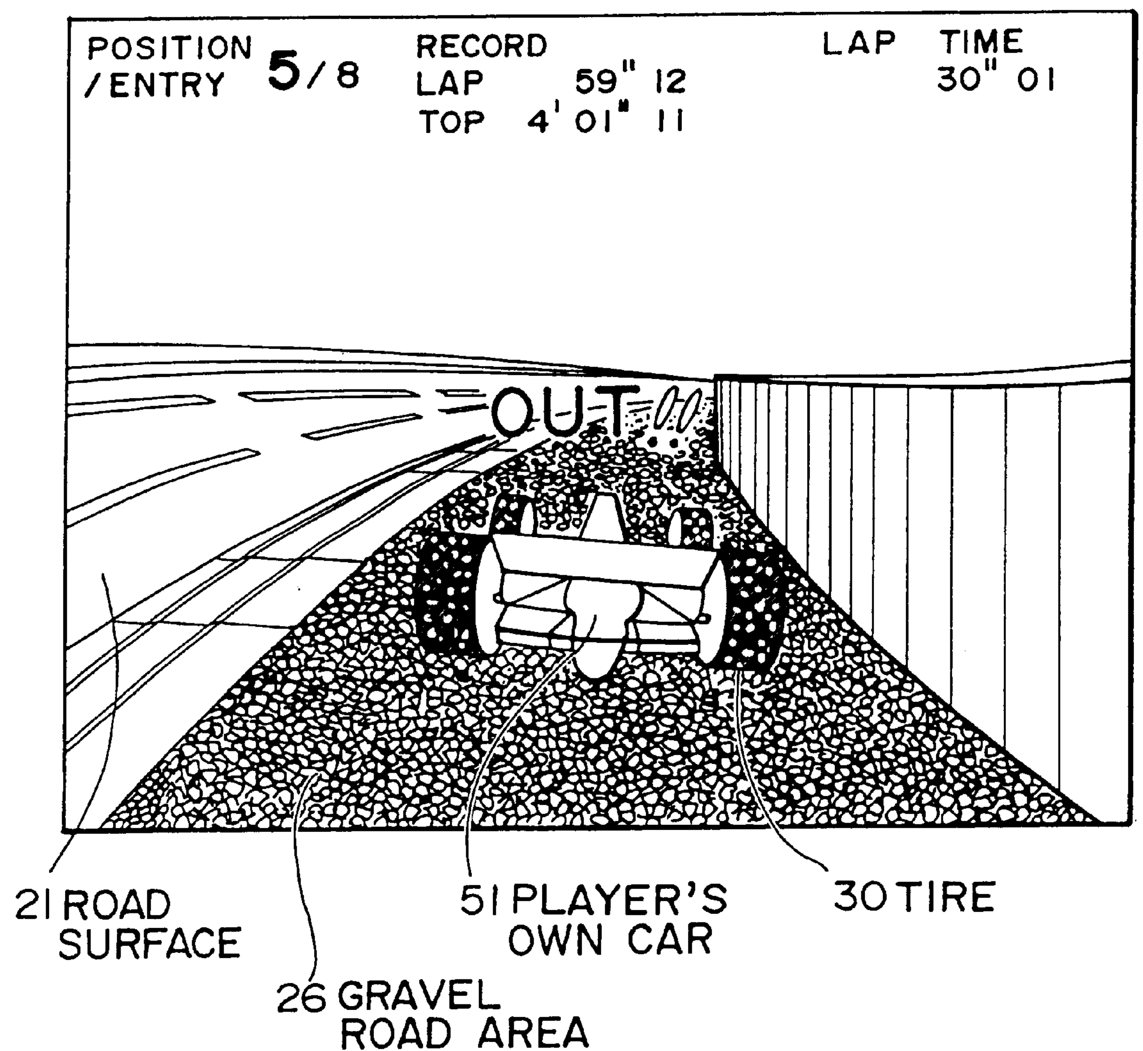
FIG. 5 shows another example of a game scene synthesized by the present three-dimensional simulator apparatus.

Examples of games scenes projected on the display 10 during this 3D game are as shown in FIGS. 4 and 5. The player drives a player-operated car 51 while watching this game scene, and competes against another opponent's racing car 52 or a computer-operated car 53. Note that the player's viewpoint in FIGS. 4 and 5 is set to be from behind the player-operated car, but the player's viewpoint may equally well be set to be from the driving seat position.

The texture of lettering 40 as shown in FIG. 4 is applied to tires 30 of the opponent's racing car 52. In this case, the tires 30 rotate rapidly when the opponent's racing car 52 is travelling at high speed. In this embodiment, a texture of lettering 40 with blurred outlines is mapped onto the side surface of the tire in such a case. This makes it possible for the game scene projected on the display to be realistic. Note that when each racing car is stationary, such as at the start of the race, a texture of halted lettering is mapped onto the tires 30 in this embodiment. As the running speed of the racing car increases and thus the rotational speed of the tires increases, a texture of lettering in which the outlines are not blurred but the lettering appears to flow in the direction of rotation of the tires is mapped onto the tires 30. As the rotational speed increases further, a texture of lettering with blurred outlines is mapped onto the tires 30, as shown in FIG. 4. Thus, a more realistic displayed image can be achieved by this embodiment because the type of texture mapped onto the tires changes in steps consistent with the rotational velocity of the tires (or the running speed of the racing car).

A game scene that appears when the player-operated car 51 leaves the course and runs into a gravel road area 26 as a result of a driving error on the part of the player is shown in FIG. 5. If a racing car enters the gravel road area 26 in this manner, gravel and sand would adhere to the tires 30 in the real world and thus the tires ought to become speckled with white. In this embodiment, the texture to be mapped onto the tires 30 when a racing car has entered the gravel road area 26 changes as shown in FIG. 5. Thus the running surfaces of the tires 30 change from completely black to slightly speckled with white, making it possible to achieve a more realistic game scene. Note that the type of texture mapped onto the tires 30 may be changed in steps in accordance with a factor such as the distance travelled within the gravel road area 26, in the same manner as with the lettering described above.

2. Description of Entire Apparatus

Figure 1:
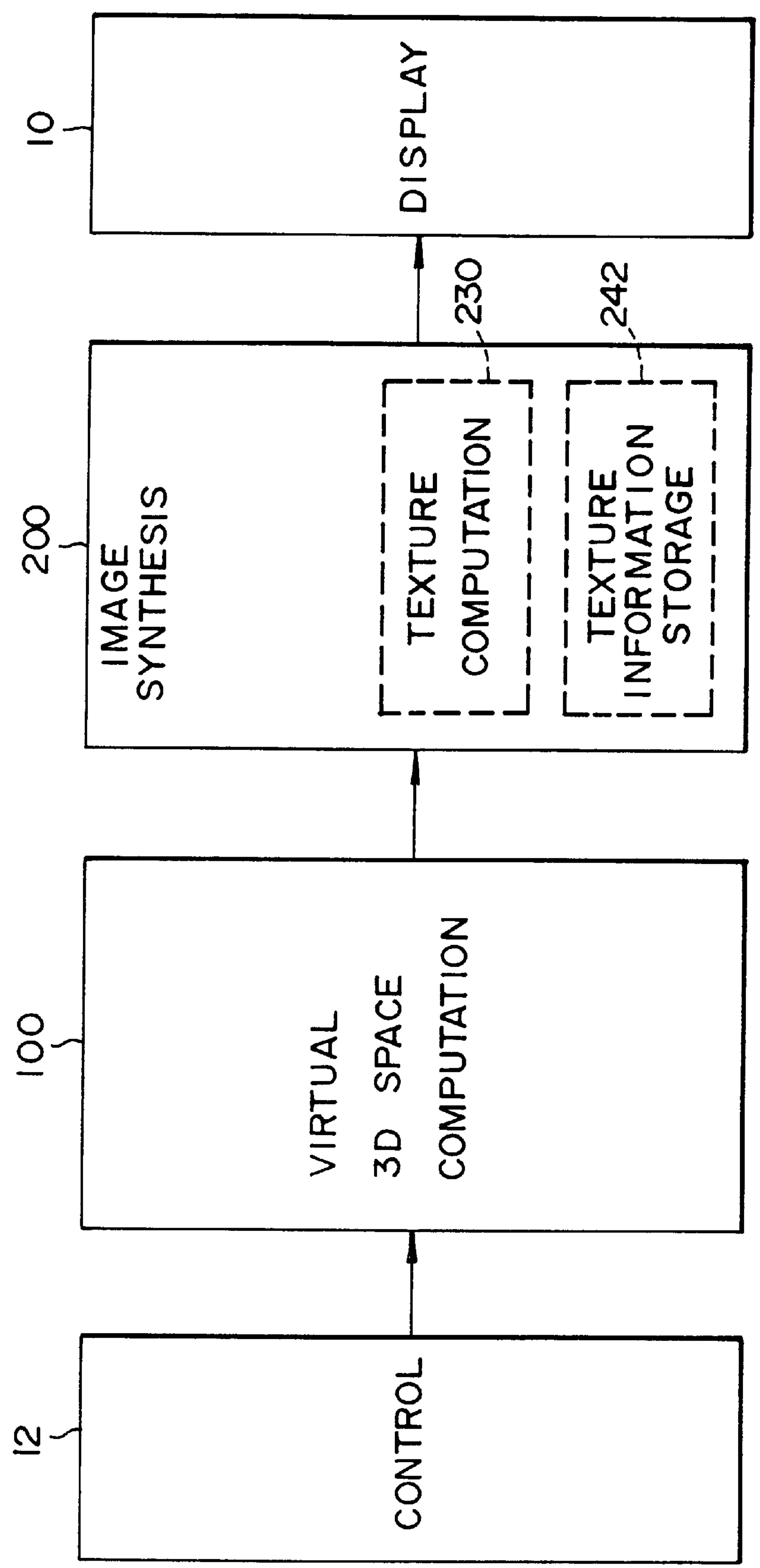
FIG. 1 shows a representative block diagram of an embodiment in accordance with the present invention.

A block diagram of an example of the three-dimensional (3D) simulator apparatus to which the present invention is applied is shown in FIG. 1.

As shown in FIG. 1, this 3D simulator apparatus comprises a control section 12 to which the player inputs operating signals, a virtual 3D space computation section 100 that performs computations for setting a virtual 3D space according to a predetermined games program, an image synthesis section 200 that forms a pseudo-3D image as seen from the viewpoint position of the player, and the display 10 that outputs this pseudo-3D image.

When this 3D simulator apparatus is applied to a racing car game, for example, the control section 12 is connected to controls such as the steering wheel 14 and accelerator pedal 15 for driving the racing car, and operating signals are input thereby.

The virtual 3D space computation section 100 performs computations to set either the position alone or the position and orientation of the display objects within the virtual 3D space shown in FIG. 3, such as the course 20, buildings 60, arches 62, stands 64, cliffs 66, the player's own racing car, other players' racing cars, and computer-operated cars. These computations are based on data such as operating signals from the control section 12 and map information that was stored previously.

The image synthesis section 200 performs computations to form a field-of-view image as seen from any desired viewpoint within the virtual 3D space, on the basis of the computation results from the virtual 3D space computation section 100. The thus formed field-of-view image is output by the display 10.

In this embodiment, the image synthesis section 200 comprises a texture computation section 230 and a texture information storage section 242. In this case, the texture computation section 230 performs computations for mapping a texture onto a display object. The texture information storage section 242 stores texture information for the mapping done by the texture computation section 230. This texture information represents patterns such as the patterns of lettering and wheels to be mapped onto the side surface of a tire, or that of a tread surface to be mapped onto the running surface of the tire. A plurality of types of texture information are stored in the texture information storage section 242 for the same display object, such as a tire. More specifically, texture information representing lettering and a wheel (spoke) pattern for a halted state, texture information representing lettering and a wheel pattern that are slightly blurred by the rotation of the tire, and texture information representing lettering and a wheel pattern that are completely blurred so that they flow in the direction of rotation of the tire are stored as textures to be mapped onto the side surface of the tire. Similarly, texture information representing a totally black tread surface, texture information representing a tread surface that has gravel adhering to it and is speckled with white, and texture information representing an even whiter tread surface are stored as textures to be mapped onto the running surface of the tire. The 3D simulator apparatus of this embodiment also comprises means for modifying the type of texture information, such as that to be mapped onto the side surface of the tire, in a manner consistent with a factor such as the rotational velocity of the tire or the running speed of the racing car. Similarly, the apparatus also comprises means for modifying the type of information of the texture to be mapped onto the running surface of the tire in a manner consistent with the surface-state of the tire that changes with the circumstances of the simulation (game circumstances). In other words, if the circumstances of the simulation become such that the racing car leaves the course and enters a gravel road area and thus the state of the running surface of a tire that is a display object is to change to become speckled with white, for example, texture information representing a whitish surface is used for mapping onto the running surface of the tire. Note that these modification means may be formed within either a virtual 3D space computation section 100 or the image synthesis section 200, or within both.

Examples of specific configurations of the virtual 3D space computation section 100 and image synthesis section 200 will now be described. A block diagram of the virtual 3D space computation section 100 is shown in FIG. 6 and block diagrams of the image synthesis section 200 are shown in FIGS. 9 and 12.

Figure 6:
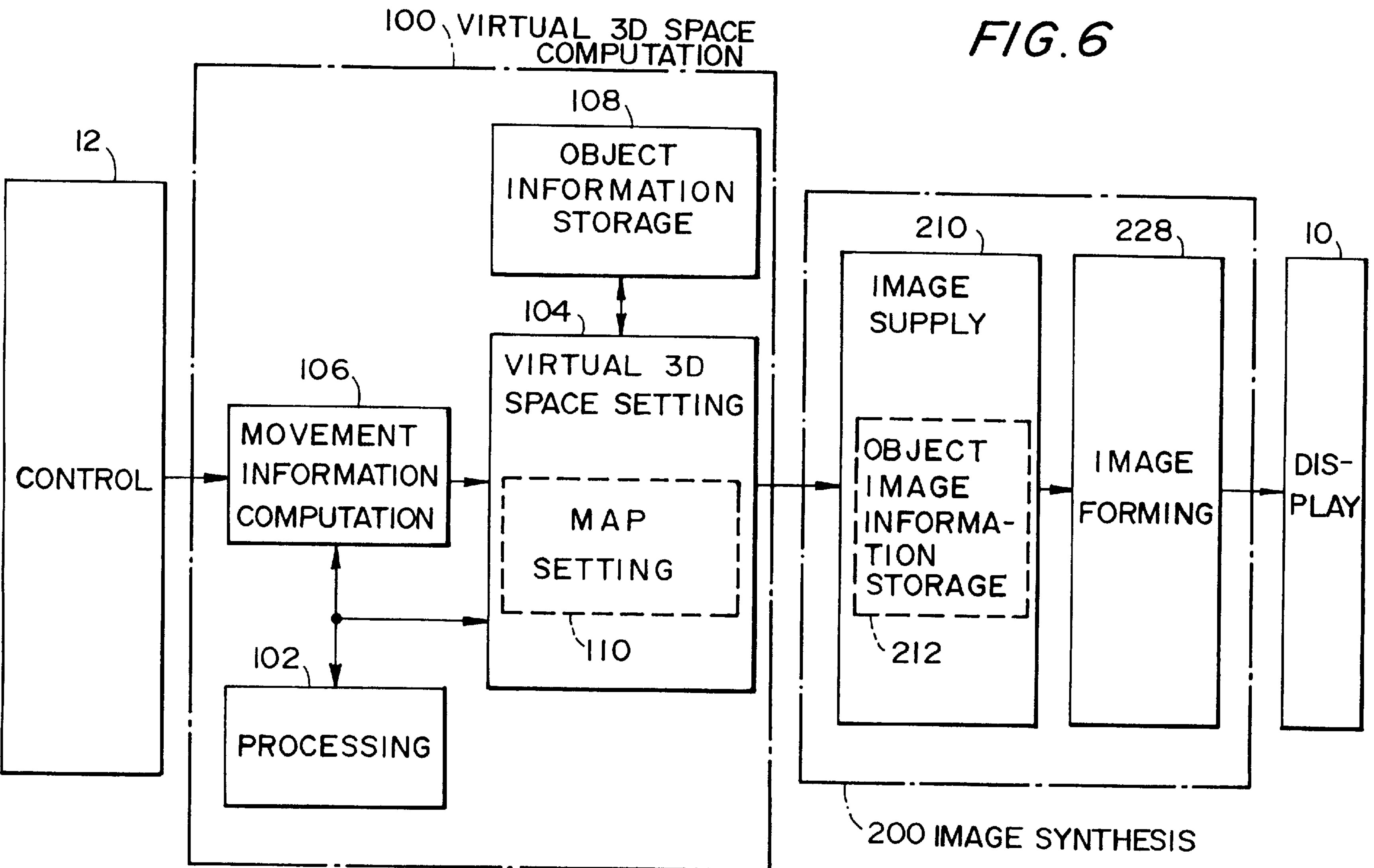
FIG. 6 shows a representative block diagram of a virtual 3D space computation section.
Figure 9:
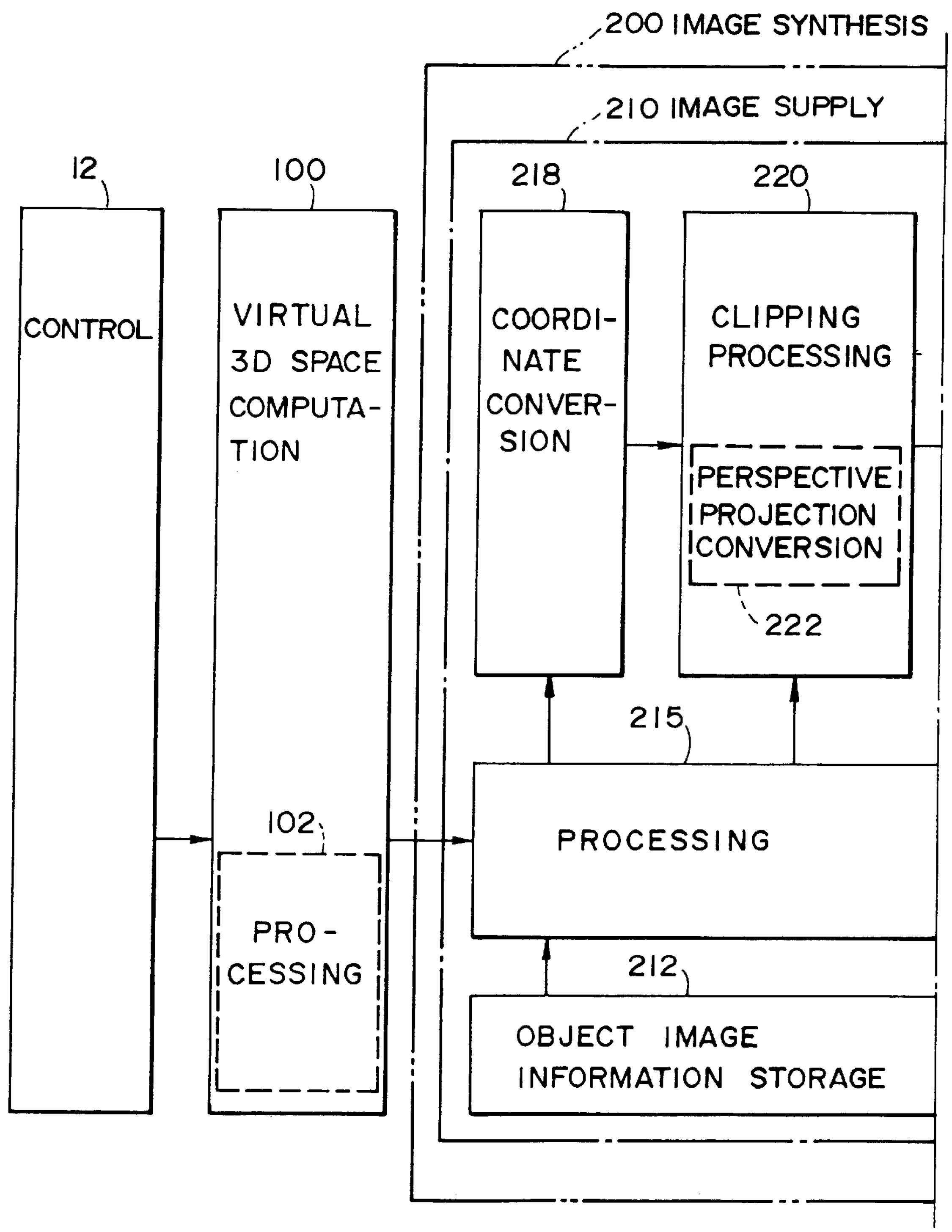
FIG. 9 shows a representative block diagram of the image synthesis section.
Figure 12:
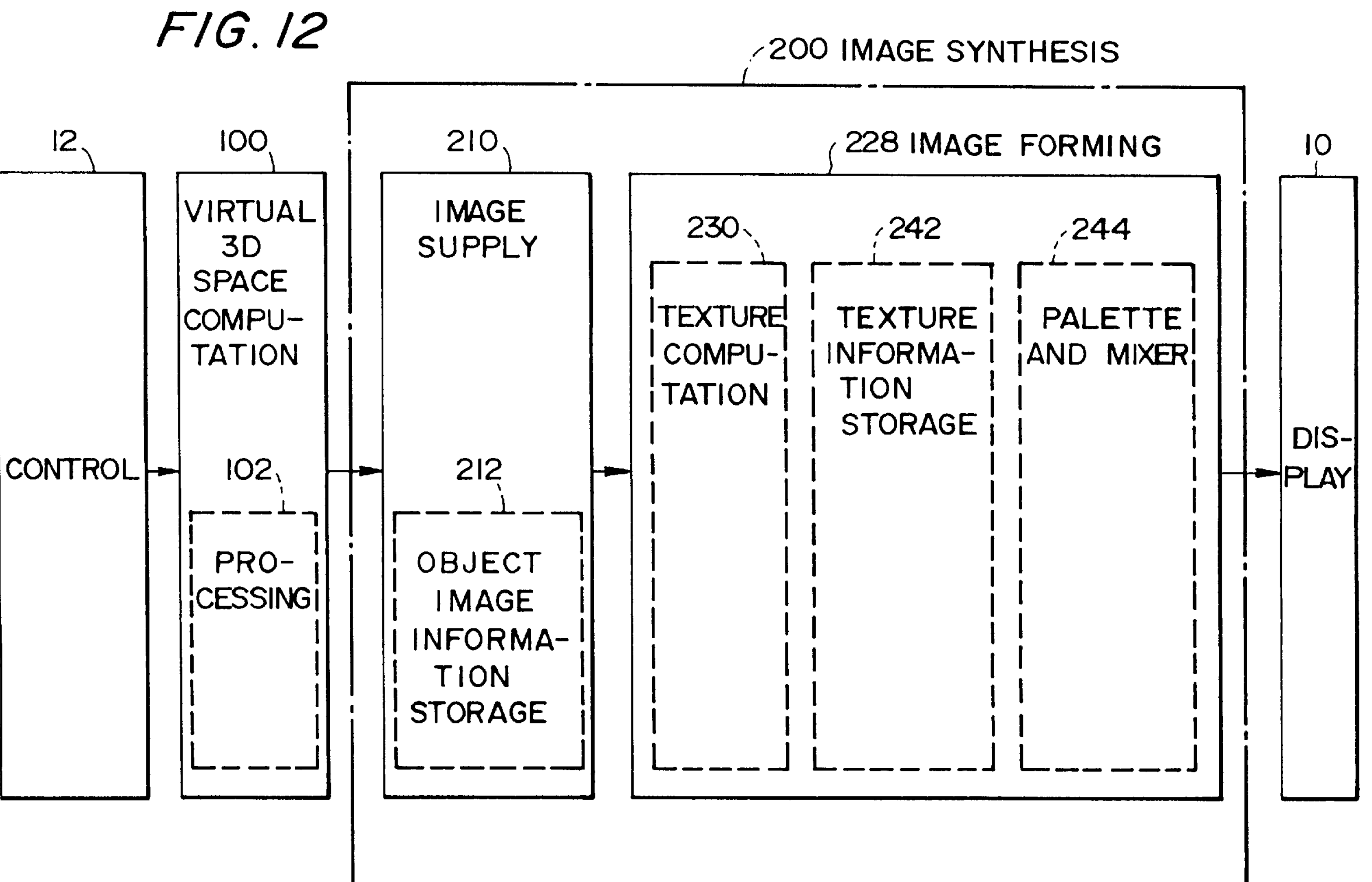
FIG. 12 shows another representative block diagram of the image synthesis section.

Note that the configurations of the virtual 3D space computation means and image synthesis means of the present invention are not limited to the embodiments shown in FIGS. 6, 9, and 12; many different types of configuration can be used therefor.

3. Description of Virtual Three-Dimensional Space Computation Section As shown in FIG. 6, the virtual three-dimensional (3D) space computation section 100 comprises a processing section 102, a virtual 3D space setting section 104, a movement information computation section 106, and an object information storage section 108.

In this embodiment, control of the entire 3D simulator apparatus is performed by the processing section 102. A predetermined games program is stored within a memory section that is provided within the processing section 102. The virtual 3D space computation section 100 calculates the setting of a virtual 3D space in accordance with this games program and operating signals from the-control section 12.

Movement information for the racing car is computed by the movement information computation section 106 in accordance with data such as operating signals from the control section 12 and instructions from the processing section 102.

Figure 8:
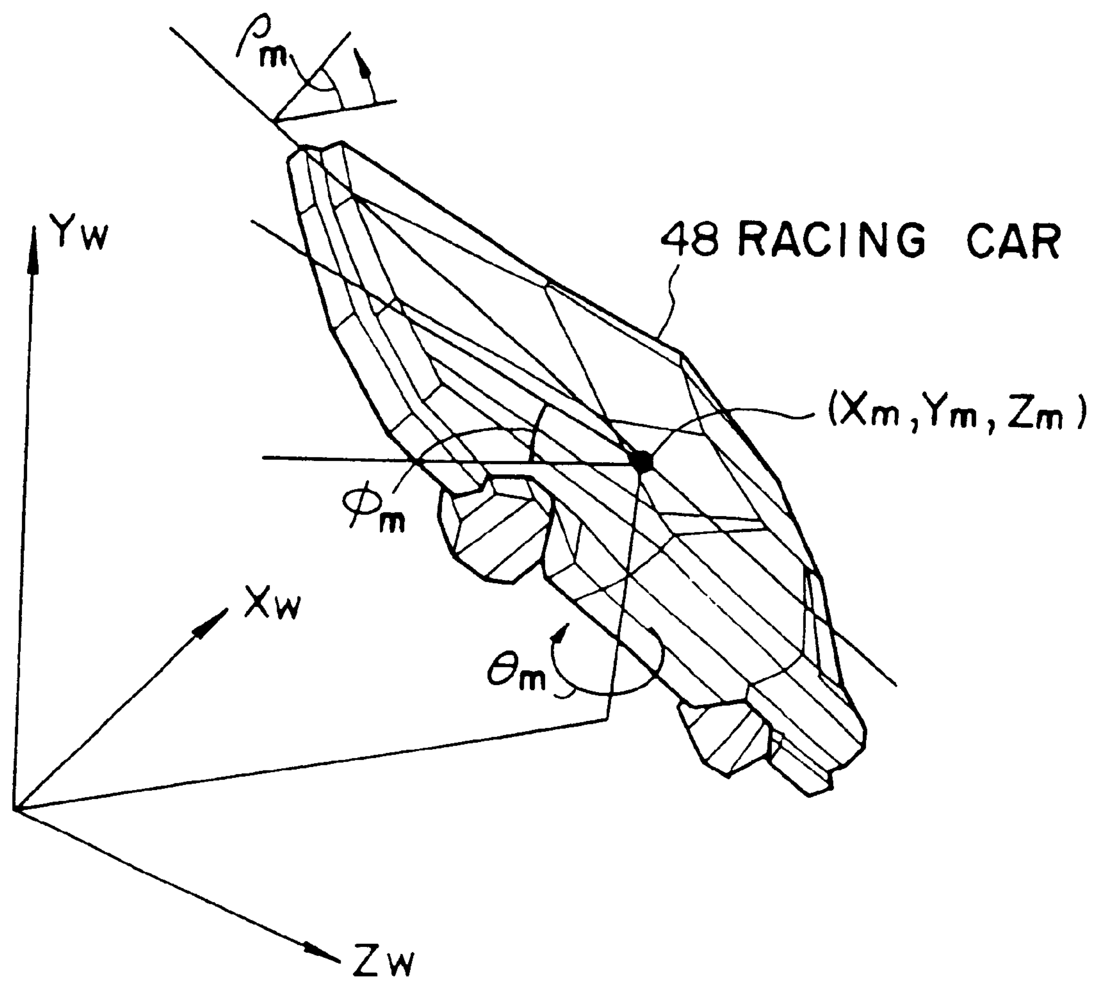
FIG. 8 is a schematic view illustrating display object information that is set for an object.

Storage areas of the same number as the number of display objects configuring the virtual 3D space are provided in the object information storage section 108. Each of these areas contains position and orientation information for one of these display objects as well as an object number of an object to be displayed at that position, that is, to be applied to that display object (this stored position and orientation information and the object number is hereinafter called object information). An example of the object information stored in the object information storage section 108 is shown in FIG. 7. The relationship between position and orientation information (Xm, Ym, Zm, θm, Φm, ρm) formed within this display object information and an absolute coordinate system (Xw, Yw, Zw) is shown in FIG. 8. In this case, each of these objects is represented by a collection of multi-sided polygons, as shown in FIG. 8.

The display object information stored in the object information storage section 108 is read out by the virtual 3D space setting section 104. At that point, display object information for the frame before the current frame is stored in the object information storage section 108. Display object information (position and orientation information) for that frame is obtained by the virtual 3D space setting section 104 on the basis of the thus read-out display object information and movement information computed by the movement information computation section 106. Note that this processing is not necessary for a static object because there is no such movement information and thus the object information therefor does not change.

In this manner, display object information for all the display objects that configure the virtual 3D space for that frame is set by the virtual 3D space setting section 104. Note that a map setting section 110 selects a map for a relevant portion when a segmented map is to be displayed in the virtual 3D space.

With this embodiment, modification of information on the texture to be mapped onto a display object is done by changing the object number within the object information shown in FIG. 7. Consider a case in which object information for mapping onto the side surface of a tire is to be modified in a manner consistent with the rotational velocity of the tire (or the running speed of the racing car), for example. In this case, the rotational speed of the tire (or the running speed of the racing car) is first obtained from computations performed by the movement information computation section 106 or the virtual 3D space setting section 104. If it is determined thereby that the rotation of the tire is halted or the tire is rotating at a low speed, the object number of the tire is changed to specify a tire object for a halted state. Similarly, if it is determined that the tire is rotating at an intermediate speed or a high speed, the object number of the tire is changed to specify a tire object for an intermediate-speed rotational state or a high-speed rotational state. Sets of image information for a plurality of types of tire object corresponding to a single tire are stored in an object image information storage section 212 within the image synthesis section 200. The selection of one of these types of tire object is specified by the above described object number. If the tire object for the halted state is selected by specifying the appropriate object number, for example, image information for the tire object for the halted state is read from the object image information storage section 212. This tire object for the halted state specifies texture coordinates (coordinates for reading texture information) that show the lettering and wheel pattern mapped in a halted manner onto the side surface of the tire. It is also possible to rotate this tire object for the halted state, to represent the side surface of a tire that is rotating at a low speed.

In a similar manner, tire objects for intermediate-speed and high-speed rotational states specify texture coordinates for mapping textures that have the same polygonal form, but the outlines of the lettering and wheel pattern thereof appear to be blurred or appear to be flowing in the direction of rotation. Thus this embodiment makes it possible to change the information on the texture to be mapped onto a tire by changing the object number.

A similar method is used for changing object information for mapping onto the running surface of the tire in a manner consistent with the circumstances of the simulation (game). In other words, computations performed by the movement information computation section 106 or the virtual 3D space setting section 104 determine whether or not the racing car has entered a gravel road area, or how far it has travelled within this gravel road area. The object number of the tire is changed on the basis of this determination, and thus the information on the texture to be mapped onto the tire object, which is read out from the object image information storage section 212, is changed.

4. Description of Image Supply Section

An image supply section 210 comprises the object image information storage section 212, a processing section 215, a coordinate conversion section 218, a clipping processing section 220, a polygon data conversion section 224, and a sorting processing section 226, as shown in FIG. 9. The clipping processing section 220 further comprises a perspective projection conversion section 222.

Various types of coordinate conversion processing and three-dimensional (3D) computation processing are performed by the image supply section 210, in accordance with setting information for the virtual 3D space that is set by the virtual 3D space computation section 100.

Figure 10:
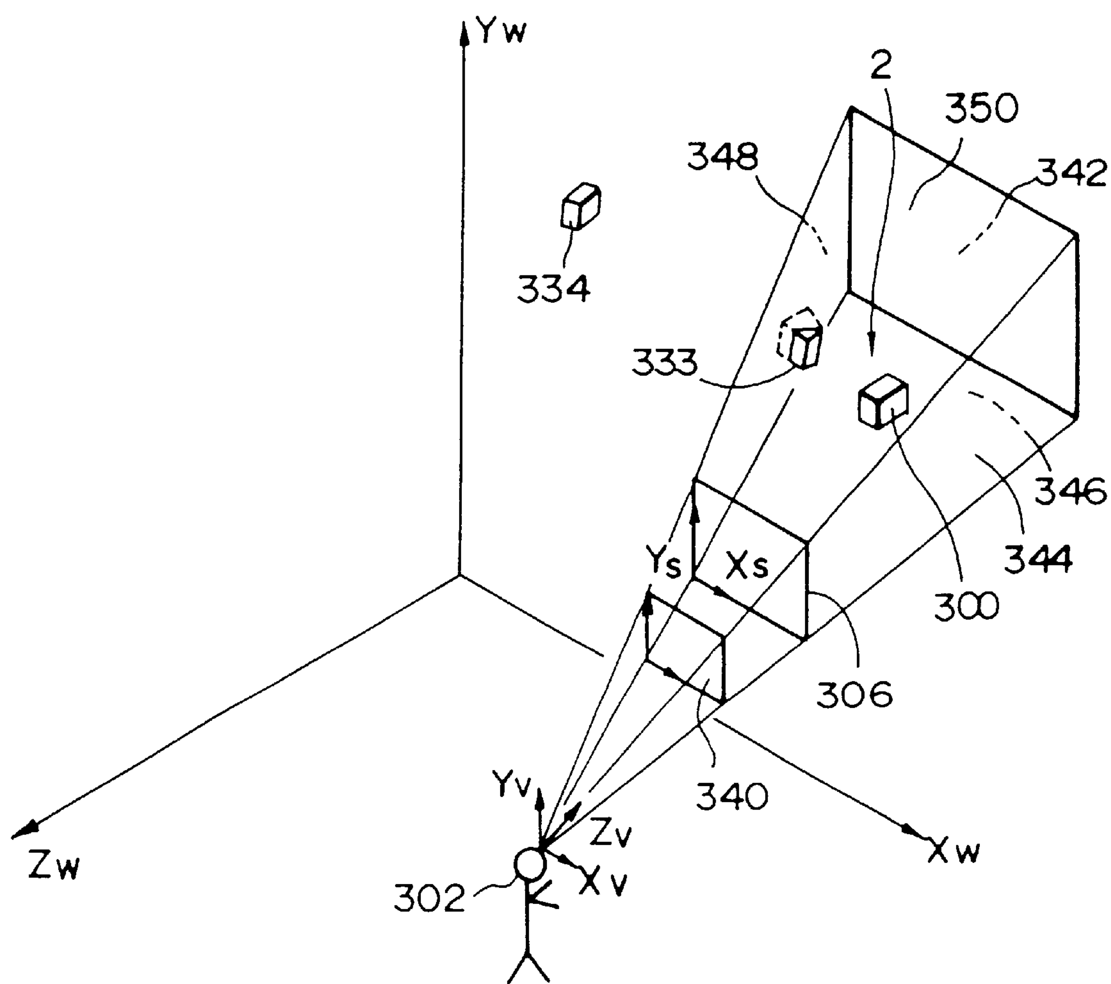
FIG. 10 is a view illustrating the 3D computation processing of the present embodiment.

First of all, computations are performed for objects 300, 333, and 334 that depict elements such as a racing car and the course, to place the polygons that configure these objects in a virtual 3D space expressed in absolute coordinates that is, world coordinates (XW, YW, ZW), as shown in FIG. 10. The coordinates of each of the polygons configuring these objects are then converted into a viewpoint coordinate system (Xv, Yv, Zv) referenced to the viewpoint of the player 302. A process called clipping processing is then done, followed by perspective projection conversion into a screen coordinate system (XS, YS). The thus output polygon format is converted, and finally the data is sorted.

In this embodiment, object information which comprises position and orientation information and the object number of each object, is transferred from the virtual 3D space computation section 100 to the processing section 215. The thus transferred object number is used as an address to read out image information for the corresponding object from the object image information storage section 212. In other words, if the object number specifies a tire object for use when the racing car is halted, for example, image information representing that tire object in a halted state is read from the object image information storage section 212. In a similar manner, if the object number specifies the tire object for the intermediate-speed or high-speed rotational state, image information representing the tire object for the intermediate-speed or high-speed rotational state is read out from the object image information storage section 212. Each set of tire image information is stored in the object image information storage section 212 as a collection of a plurality of polygons (multi-sided figures). A data formatting section 217 forms data that combines the frame data, object data, and polygon data from the thus read-out data, then the processing section 215 sequentially transfers that data to the coordinate conversion section 218 onward.

In this case, frame data refers to data on the viewpoint position and orientation of the player 302 within the virtual 3D space. Object data is configured of position and orientation information for the object, together with associated data.

Figure 11A:
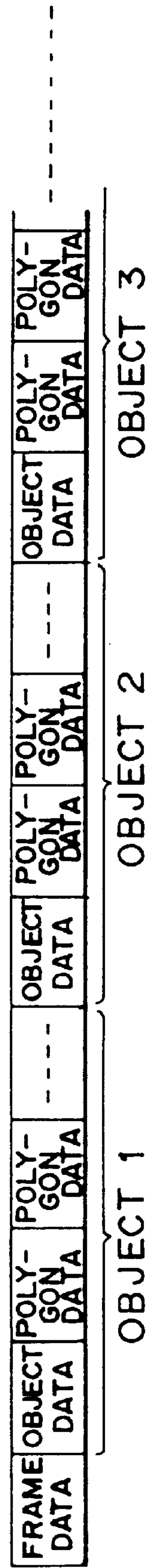
FIGS. 11A and 11B show an example of the data format created by the data formatting section.

Polygon data is image information for the polygons that configure each object, consisting of polygon vertex coordinates, vertex texture coordinates, vertex brightness information, and other associated data. This data is converted by the data formatting section 217 into the data format shown in FIGS. 11A and 11B. FIG. 11A shows how this data format starts with frame data, followed by data for objects displayed in this frame. Each set of object data starts with data for the polygons that configure that object. Each set of this polygon data comprises a header and vertex brightness information, vertex texture coordinates, and vertex coordinates to be applied to each vertex of the polygon, as shown in FIG. 11B.

Figure 11B:
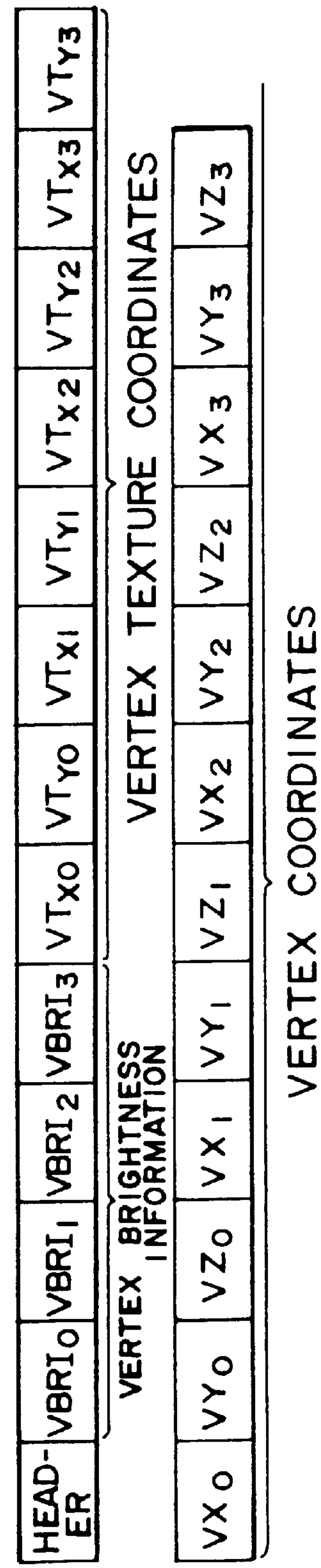

In this embodiment, the tire object for the halted state and the tire objects for the intermediate-speed and high-speed rotational states are set to have different values for the vertex texture coordinates shown in FIG. 11B. These vertex texture coordinates are used as address information when reading texture information from a texture information storage section, as will be described later. Thus the configuration is such that, if these vertex texture coordinates are different, the information on the texture to be mapped onto the tire is also different.

5. Description of Image Forming Section

An image forming section 228 computes image information within polygons, based on vertex image information given for each vertex of these polygons, then outputs this information to the display 10. The image forming section 228 comprises the texture computation section 230, the texture information storage section 242, and a palette and mixer circuit 244, as shown in FIG. 10.

In this embodiment, image synthesis by methods called texture mapping and Gouraud shading is done in order to form a higher-quality image more efficiently. A brief outline of each of these methods is given below.

Figure 13:
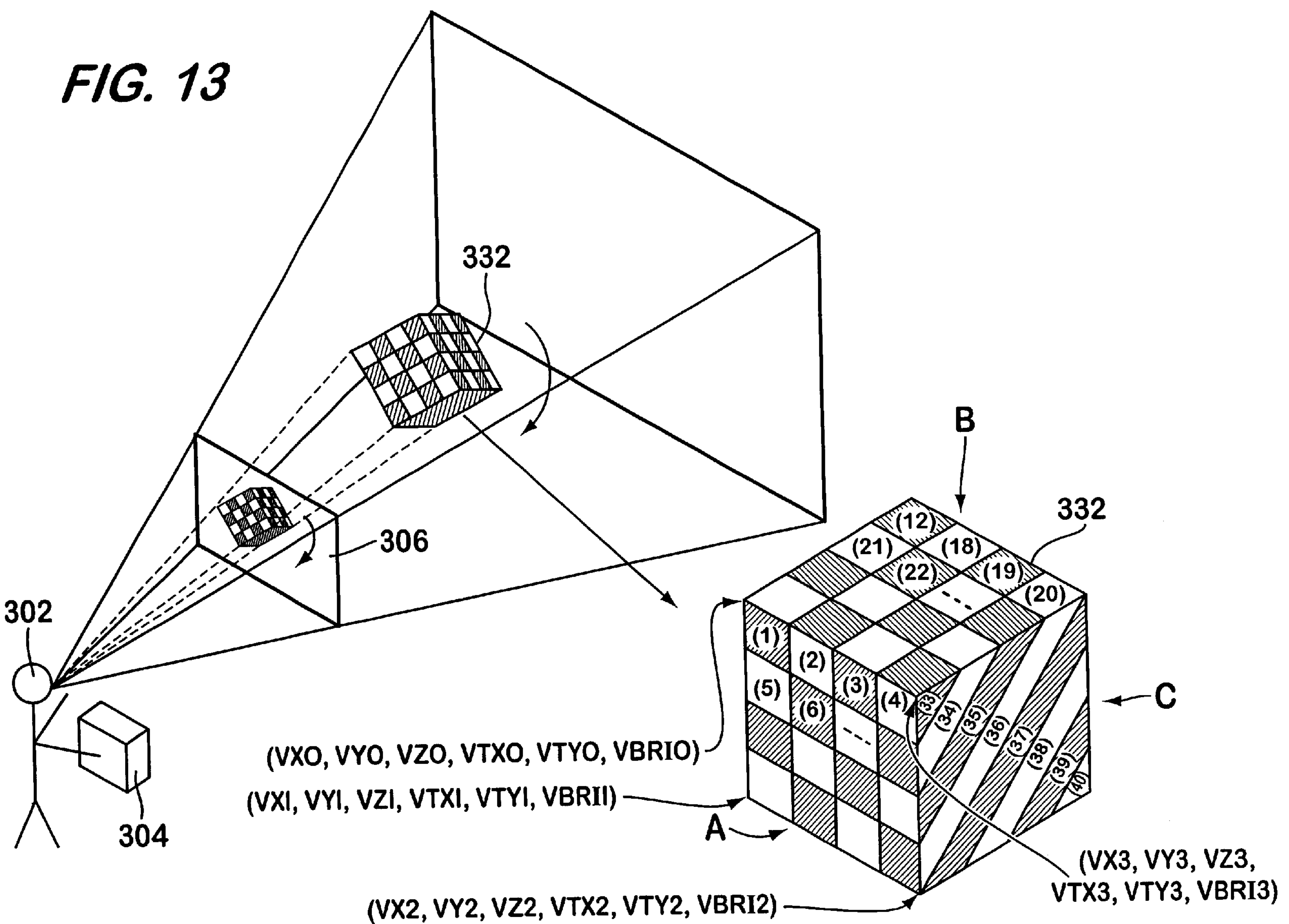
FIG. 13 is illustrative of a texture mapping method.

The concept of the texture mapping method is shown in FIG. 13.

In the prior art, when an image is formed in such a manner that a checkerboard or striped pattern is implemented on each of the surfaces of an object 332, as shown in FIG. 13, the object is divided into polygons (1) to (80) (where polygons (41) to (80) are not shown in the figure) and image processing is performed for all of these polygons. This is because no more than one color can be specified when painting each polygon in a prior-art image synthesis device. As a result, an extremely large number of polygons is required for forming a high-quality image on which a complicated pattern or other effect is implemented, and thus it is substantially impossible to create such a high-quality image.

With this embodiment, the processing of the object 332 is divided in such a manner that coordinate conversion such as rotation, forward movement, and perspective projection conversion and processing such as clipping are performed for each of polygons A, B, and C that configure the surfaces thereof (more specifically, for each polygon vertex), and a checkerboard or striped pattern is handled as a texture. In other words, the texture information storage section 242 is provided within the image forming section 228, as shown in FIG. 12, and image information for information on the texture to be mapped onto each of the 3D polygons, such as a checkerboard or striped pattern, is stored therein.

Addresses in the texture information storage section 242 that specify this texture information are given as vertex texture coordinates VTX, VTY for each 3D polygon. More specifically, vertex texture coordinates (VTX0, VTY0), (VTX1, VTY1) , (VTX2, VTY2), and (VTX3, VTY3) are set for each of the vertices of polygon A in FIG. 13.

The texture computation section 230 within the image forming section 228 obtains texture coordinates TX, TY for all the dots within a polygon from these vertex texture coordinates VTX, VTY. Corresponding texture information is read out from the texture information storage section 242 according to the thus obtained texture coordinates TX, TY, and is output to the palette and mixer circuit 244. This makes it possible to form the image of a 3D object on which a texture such as checks or stripes is implemented, as shown in FIG. 13.

In this embodiment, the above described object 332 is represented by polygonal solids. This leads to a problem with continuity of brightness information at each boundary between polygons. For example, if a plurality of polygons is used to represent a sphere and all of the dots within each polygon are set to the same brightness, roundness cannot be expressed at boundaries between polygons, even though a representation of such roundness is desired in practice. This problem is avoided in this embodiment by use of a method called Gouraud shading. With this method, the vertex brightness information VBRI0 to VBRI3 of FIG. 13 is given for each vertex of each 3D polygon, in the same manner as that described above with reference to the texture mapping method. Brightness information for all the dots within each 3D polygon is obtained by interpolation from this vertex brightness information VBRI0 to VBRI3 when the final image is displayed by the image forming section 228.

Figure 14:
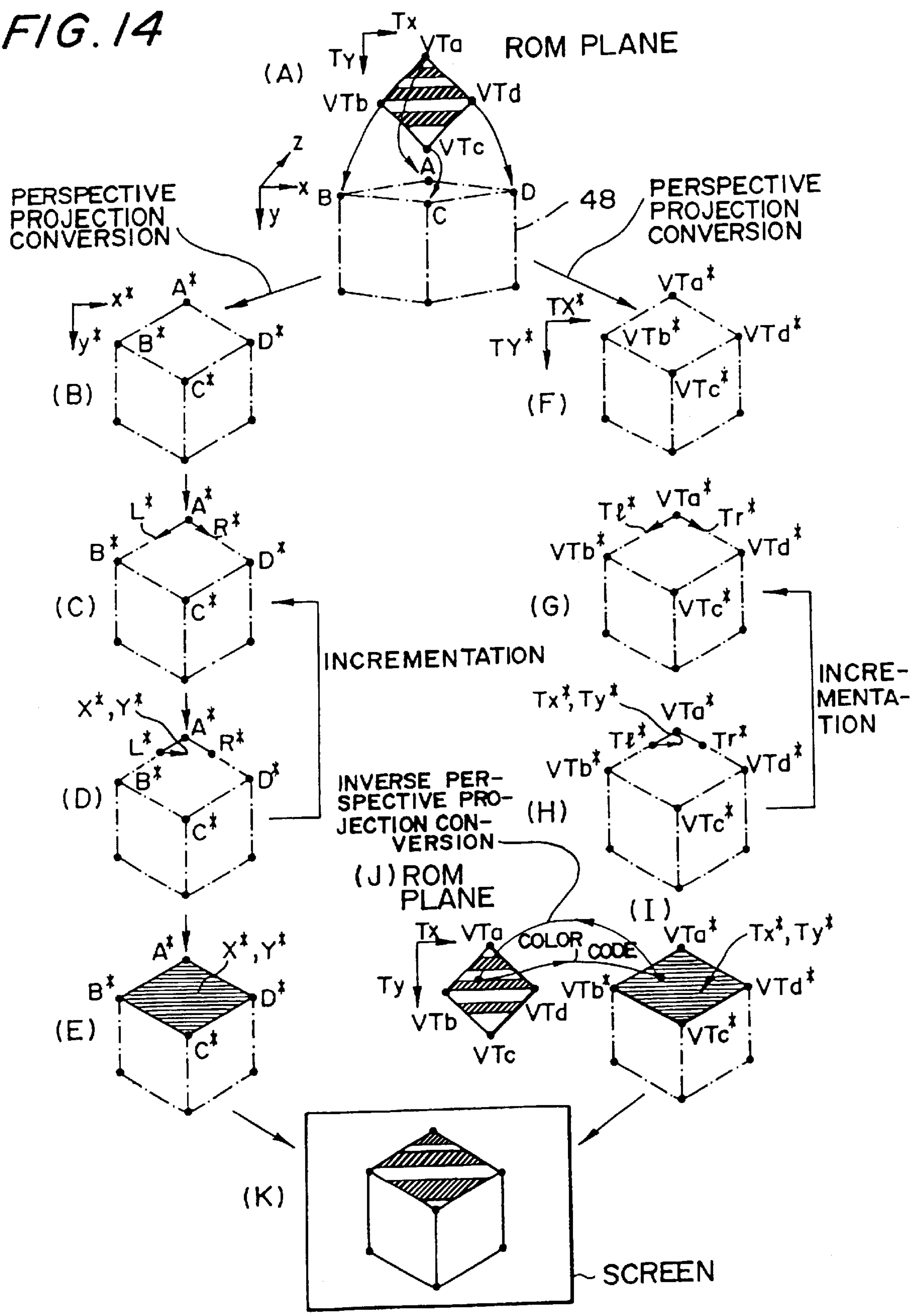
FIG. 14, images (A) to (K) illustrates the flow of computation processing for texture mapping by the present embodiment.
Figure 15:
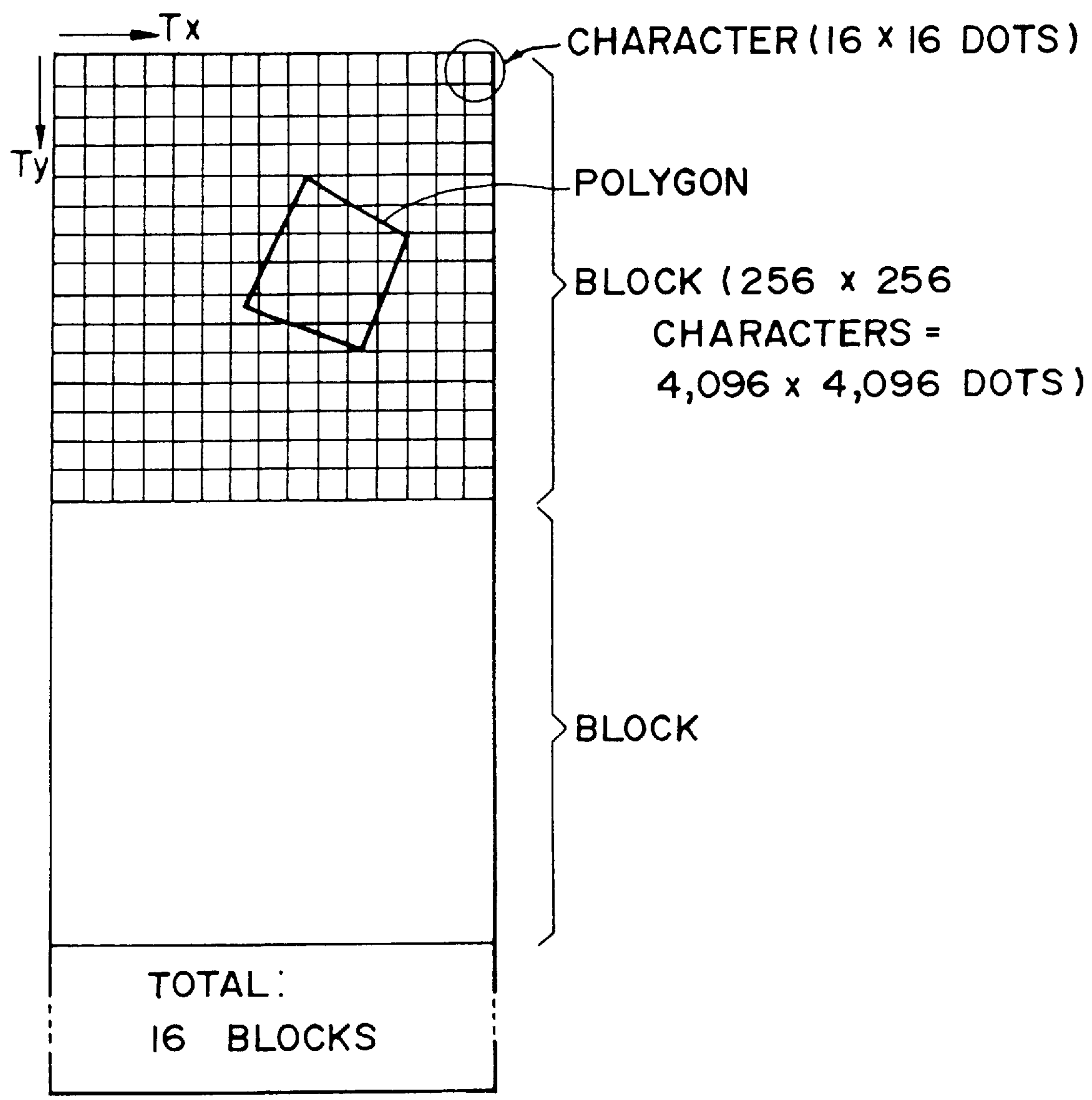
FIG. 15 shows an example of a stored texture surface created by the texture information storage section.

The flow of computation processing for texture mapping is shown pictorially in (A) to (K) of FIG. 14. As described previously, computations for forming all of the image information within polygons is performed by the image forming section 228, on the basis of polygon vertex image information. In this case, texture information that is to be mapped onto the polygons is stored in the texture information storage section 242, and texture coordinates TX, TY are required for reading out this texture information. The computation processing that derives all of the perspective conversion texture coordinates TX*, TY* within a polygon is shown pictorially in (F), (G), (H), and (I) of FIG. 14. Similarly, the computation processing that derives perspective conversion display coordinates X*, Y*, which are coordinates for the texture information to be displayed, is shown pictorially in (B), (C), (D), and (E) of FIG. 14. The above computations are performed by the texture computation section 230. The thus computed perspective conversion texture coordinates TX*, TY* are subjected to inverse-perspective projection conversion into texture coordinates TX, TY, as shown in (J) of FIG. 14. Texture information is read out from the texture information storage section 242 in accordance with the thus converted texture coordinates TX, TY. Finally, image synthesis corresponding to the read-out texture information is performed at the thus computed coordinate position X*, Y*, as shown in (K) of FIG. 14. Note that an example of a stored texture surface that is configured by the texture information storage section 242 is shown in FIG. 15.

Figure 16:
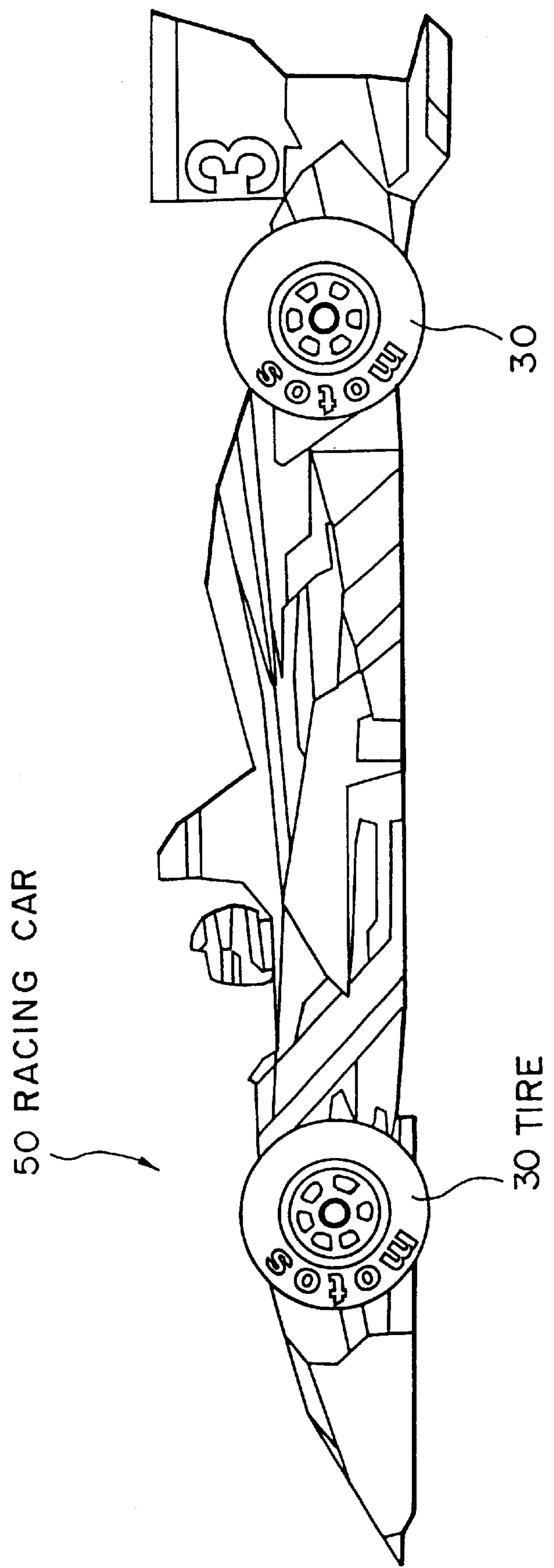
FIG. 16 shows an example of a racing car represented by texture mapping.

An example of a racing car 50 represented by the above described texture mapping is shown in FIG. 16. An extremely high-quality displayed image can be achieved by implementing texture mapping in this manner.

Figure 17:
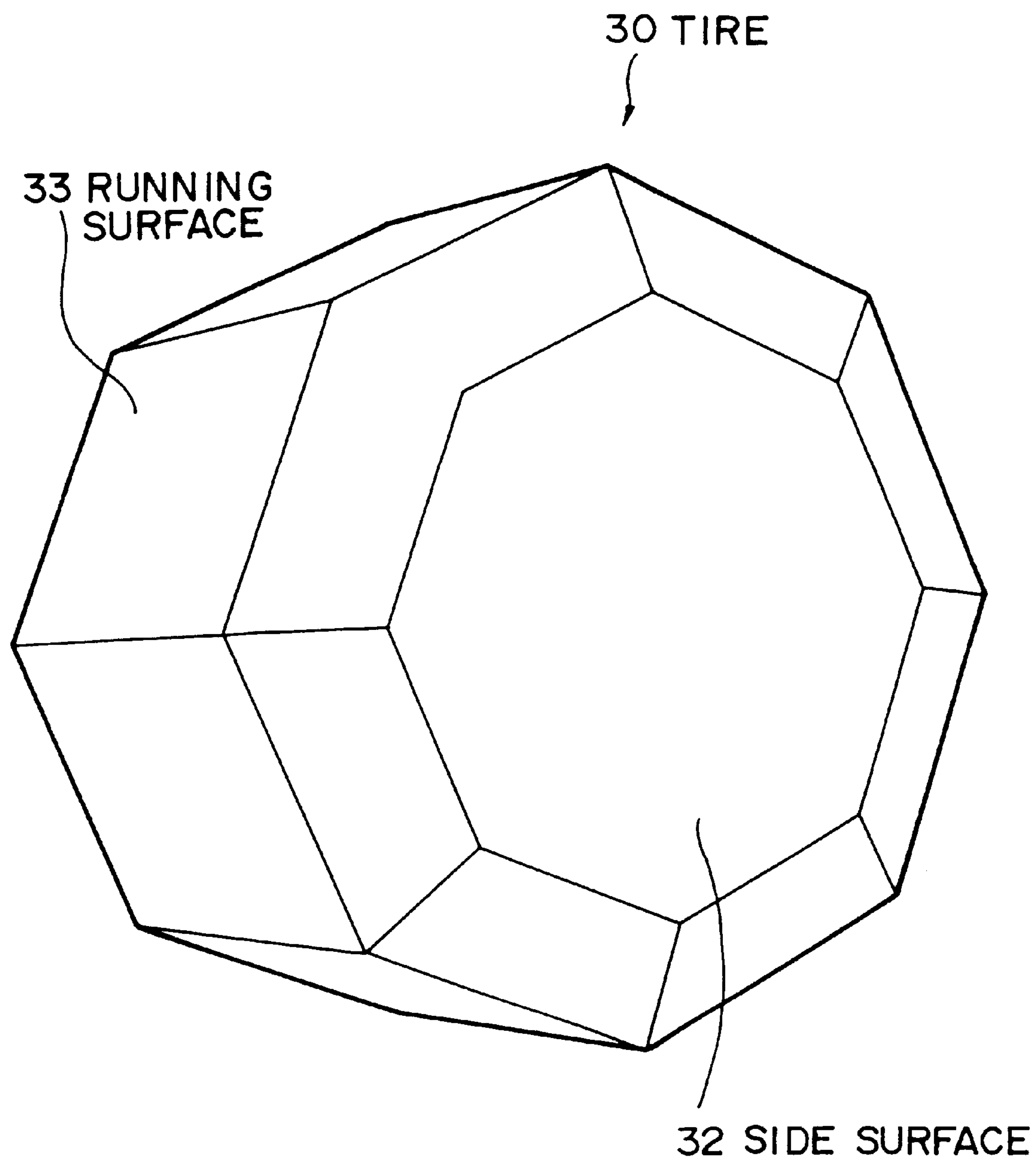
FIG. 17 shows a tire object formed by polygons.

An example of an object applied to a tire 30 that is part of the racing car 50 of FIG. 16 is shown in FIG. 17. This tire object is represented by assembling a plurality of polygons. Note that when an object is represented by a plurality of polygons as shown in FIG. 17, a problem arises in that roundness cannot be expressed at the boundaries between polygons. However, this problem can be solved by using the above described Gouraud shading method, so that a rounded tire as shown in FIG. 16 can be formed thereby.

Examples of the information on the texture to be mapped onto a side surface 32 of the tire 30 are shown in FIGS. 18A and 18B. The texture information used when the tire is in a halted state and a low-speed rotational state is shown in FIG. 18A and the texture information used when the tire is in a high-speed rotational state is shown in FIG. 18B. The outlines of lettering 34, a wheel pattern (holes) 36, and a shaft nut 38 are drawn clearly in FIG. 18A. In contrast, the outlines of the lettering 40, wheel pattern 42, and shaft nut 44 are drawn blurred in FIG. 18B, as if they are flowing in the direction of rotation at an extremely high speed. Note that texture information intermediate between that of FIG. 18A and that of FIG. 18B may be used for when the tire is rotating at an intermediate speed. It should be clear that, if the texture to be mapped changes in this manner according to the rotation of the tire, the realism of the displayed image can be greatly increased.

Figure 19A:
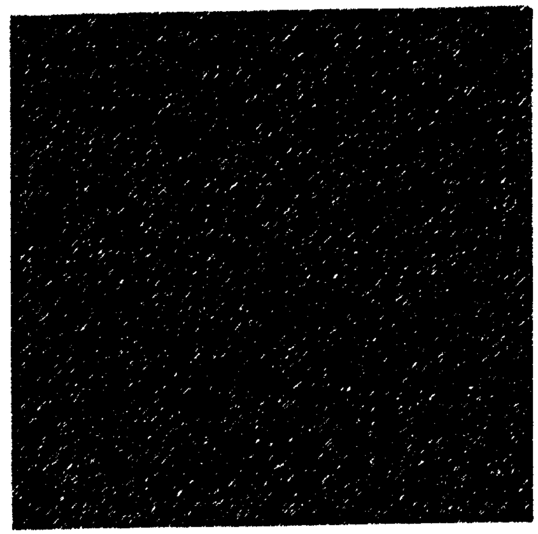
FIGS. 19A to 19C show examples of texture information mapped onto the running surface of a tire.
Figure 19B:
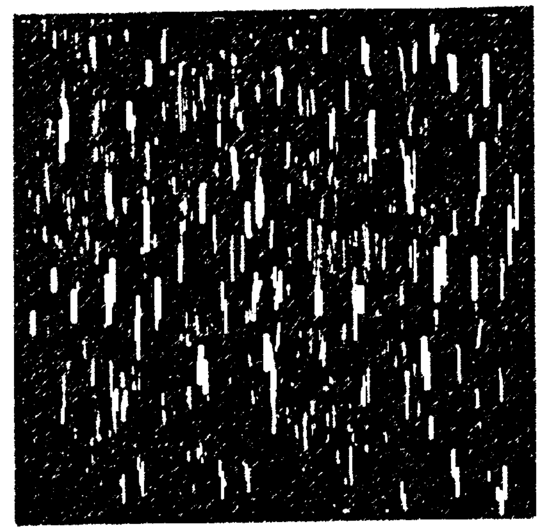
Figure 19C:
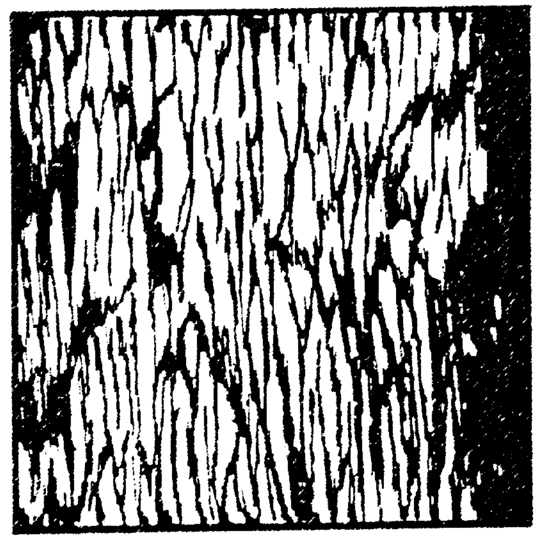
Figure 20A:
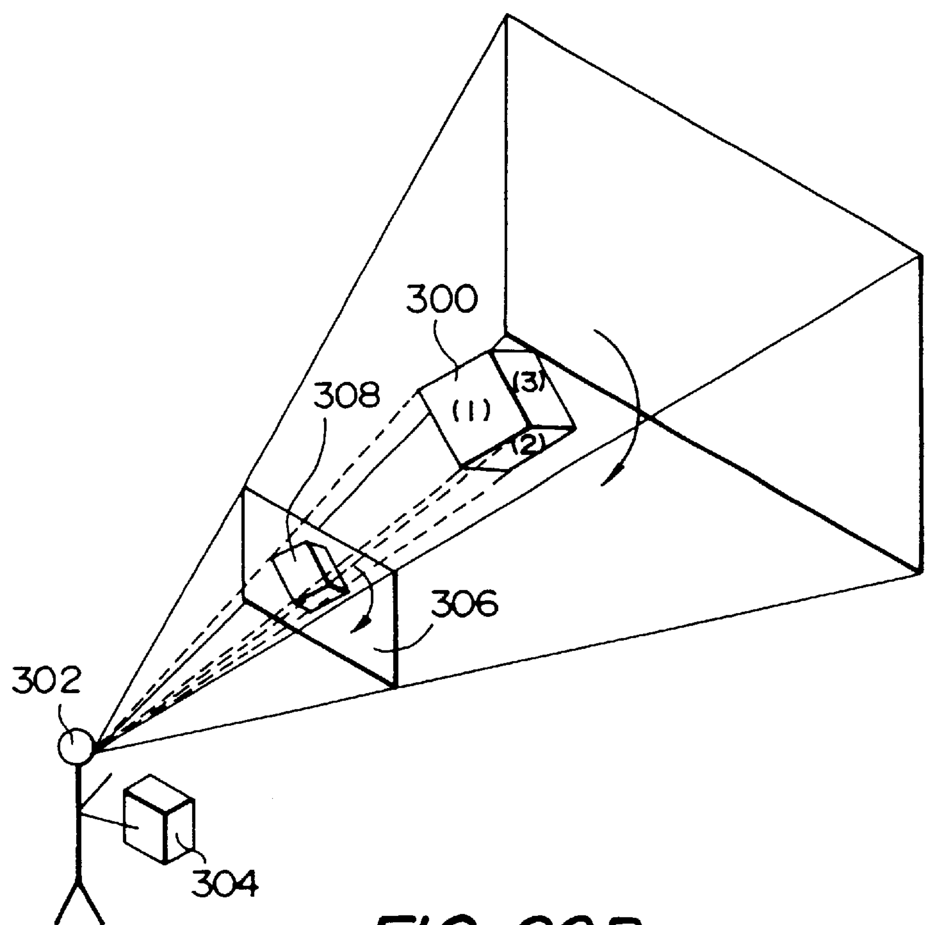
FIG. 20A is a schematic view illustrating the concept of the three-dimensional simulator apparatus.
Figure 20B:
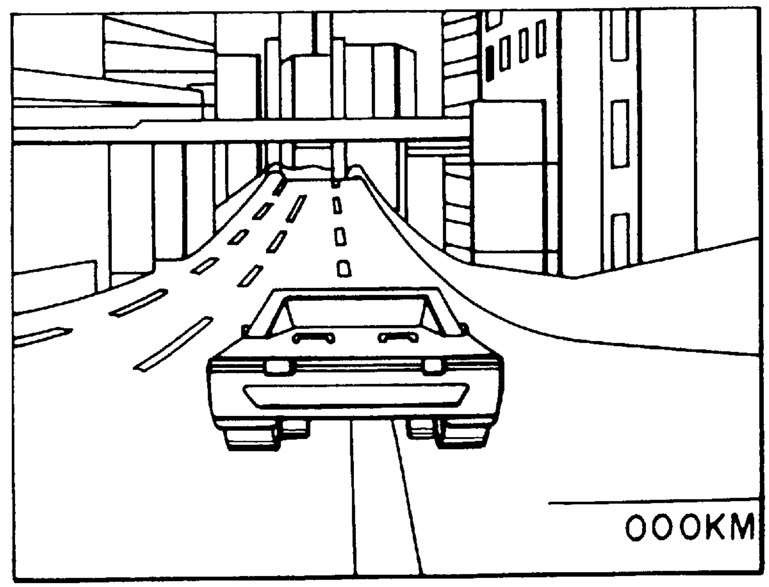
FIG. 20B shows an example of the screen formed by the present three-dimensional simulator apparatus.

Examples of information on the texture to be mapped onto a running surface 33 of the tire 30 are shown in FIGS. 19A, 19B, and 19C. This texture information may be mapped onto each individual polygon configuring the running surface 33 one at a time, or it may be mapped onto all of the polygons configuring the running surface 33 together. Texture information used when the racing car is running along the ordinary course surface is shown in FIG. 19A, and texture information used when the racing car has entered a gravel road area is shown in FIGS. 19B and 19C. The texture information in FIG. 19B is used when the distance traveled along the gravel road area is short and the texture information in FIG. 19C is used when the distance traveled is long. The texture information of FIG. 19C is the whitest of the textures, to enable a realistic representation of a state in which gravel and sand is adhering to the running surface of the tire.

Note that the present invention is not limited to the above described embodiment; it can be implemented in many various forms within the scope of the invention.

For example, the method of the present invention, which changes the type of information of the texture to be mapped on a display object in accordance with the velocity and/or rotational velocity of the display object, can be applied to many different implementations; not just to the above described mapping of a texture onto the side surface of a tire. This method may also be applied to a course surface 21, guard rail 22, and building 24 that move behind the player-operated car 51 shown in FIG. 4 as it travels. In such a case, a plurality of types of texture information may be provided in such a manner that there is information of the texture to be mapped on the course surface 21, guard rail 22, and building 24 when the player-operated car 51 is in a halted state, and information of the texture to be mapped thereon when the player-operated car 51 is traveling at an intermediate speed and high speed.

The method of changing the type of information of the texture to be mapped onto the display object in a manner consistent with the surface state of the display object is not limited to the mapping of a texture onto the running surface of a tire, as described above. The method can be applied in various other ways. For example, the information of the texture to be mapped onto the body of a racing car may be modified to dirty the body with oil every time the racing car completes another circuit of the course. Similarly, a case may be considered in which the racing car is halted by brakes and the brake pads pressed into contact with the brake discs heat up and turn red. In such a case, the red-hot parts of the brake discs not covered by the calipers ought to be visible from the outside through the holes between the spokes. To represent this phenomenon, the texture information is changed in such a manner that the surfaces of the brake discs glow red in accordance with the deceleration of the tires, enabling a more realistic representation. This effect would be particularly striking in the representation of a racing game run at night.

This embodiment is described as relating to a racing car game by way of example, but the present invention is not limited thereto. The invention can be applied to any other type of 3D game in which a map is formed in a 3D manner, such as a spaceship game, a robot-battling game, a tank-battle game, a fighter-plane game, or a role-playing game.

Similarly, the present invention is not limited to an arcade 3D game; it can equally well be applied to other purposes such as a domestic games machine, a flight simulator, or a driving simulator used in an educational establishment such as a driving school. It can also be applied to a large-scale arcade games machine or simulator where a large number of players can participate.

If the present invention is applied to a fighter-plane game, for example, the information of the texture to be mapped on the fuselage of the player's own aircraft may change in such a manner that bullet-holes appear on the fuselage every time the player's aircraft is hit by an enemy fighter. When the fighter accelerates, the information of the texture to be mapped onto an engine portion may be modified in such a manner that the engine portion of the fighter glows red because of the backfiring. Similarly, if the present invention is applied to a role-playing game, the information of the texture to be mapped onto the surfaces of clothing worn by the player and the player's party may be modified before and after a battle with an enemy, to represent the blood that ought to be produced by such a battle.

The computations performed by the virtual 3D space computation means and image synthesis means of the present invention may equally well be performed by a dedicated image processing device, or by software means using a general-purpose microprocessor or digital signal processor (DSP).

Furthermore, the computations performed by the virtual 3D space computation means and image synthesis means are not limited to those described with reference to this embodiment, and methods used therein, such as the texture mapping method, are not limited to those described above.

The present invention may naturally be applied to a 3D simulator apparatus that uses a display called a head-mounted display (HMD).

What is to be claimed:

1. A three-dimensional simulator apparatus for synthesizing a field-of-view image as seen from an observer within a virtual three-dimensional (3D) space configured of a plurality of display objects, comprising:

movement information computation means for computing at least one of a velocity and a rotational velocity of at least one of said display objects based on at least one of an operating signal input by said observer through control means and an instruction from a computer;

texture computation means for performing computations to map textures onto said display objects;

texture information storage means for storing information of said textures to be mapped by said texture computation means, said texture information storage means for storing different types of texture information corresponding to the same display object; and changing means for changing one of a type of information of at least one texture to be mapped onto at least one of said display objects and information specifying said type in accordance with at least one of said velocity and said rotational velocity of said at least one of said display objects;

wherein said at least one of said display objects moves or rotates with said texture being mapped onto said moving or rotating display object, and one of the type of information of texture and information specifying said type is changed in accordance with at least one of said velocity and rotational velocity of said moving or rotating display object, and wherein texture information for a stopped state is used when said display object stops, and same texture information is used when said display object moves or rotates at a low speed, and one of the type of information of texture and information specifying said type is changed when the display object moves or rotates at an intermediate speed.

2. The three-dimensional simulator apparatus as defined in claim 1, wherein said changing means performs said changing in steps in accordance with at least one of the velocity and the rotation velocity of said at least one display object.

3. A three-dimensional simulator apparatus, comprising: means for storing object information that comprises at least object numbers and position information for display objects configuring a virtual three-dimensional (3D) space; virtual 3D space computation means for forming said virtual 3D space by setting said object information; object image information storage means for storing image information of objects specified by said object numbers; and image synthesis means for synthesizing a field-of-view image as seen from an observer based on said object information and said image information read out in accordance with said object numbers included in said object information;

where said image synthesis means comprises:

texture computation means for performing computations to map textures onto said display objects, and texture information storage means for storing information of said textures to be mapped by said texture computation means, said texture information storage means for storing different types of texture information corresponding to the same display object;

said virtual 3D space computation means comprises:

movement information computation means for computing at least one of a velocity and a rotational velocity of at least one of said display objects based on at least one of an operating signal input by said observer through control means and an instruction from a computer;

changing means for changing at least one object number in accordance with at least one of said velocity and said rotational velocity of at least one display object specified by said at least one object number; and said object image information storage means stores said image information wherein information of a texture to be mapped onto an object that is specified by a pre-changing object number is different from information of a texture to be mapped onto an object that is specified by a post-changing object number;

wherein said at least one of said display objects moves or rotates with said texture being mapped onto said moving or rotating display object, and one of the type of information of texture and information specifying said type is changed in accordance with at least one of said velocity and rotational velocity of said moving or rotating display object, and wherein texture information for a stopped state is used when said display object stops, and same texture information is used when said display object moves or rotates at a low speed, and one of the type of information of texture and information specifying said type is changed when the display object moves or rotates at an intermediate speed.

4. A three-dimensional simulator apparatus for synthesizing a field-of-view image as seen from an observer within a virtual three-dimensional (3D) space configured of a plurality of display objects, comprising:

texture computation means for performing computations to map textures onto said display objects;

texture information storage means for storing information of said textures to be mapped by said texture computation means, said texture information storage means for storing different types of texture information corresponding to the same display object; and changing means for changing a type of information of at least one texture to be mapped onto at least one of said display objects and information specifying said type in accordance with a surface state of said at least one of said display objects, said surface state being changed with simulation circumstances in which said at least one display object contacts with first and second display objects;

wherein said texture information storage means stores a first type of texture information which represents a property of said first display object and a second type of texture information which represents a property of said second display object, and wherein said first type of texture information is used when said display object contacts with said first display object and said second type of texture information is used when said display object contacts with said second display object.

5. The three-dimensional simulator apparatus as defined in claim 4, wherein said changing means performs said changing in steps in accordance with a surface state of said at least one display object.

6. The three-dimensional simulator apparatus as defined in claim 5, wherein one of the type of information of texture and the information specifying said type is changed in accordance with a surface state of a tire, said surface state of said tire being changed with simulation circumstances in which said tire contacts with a road.

7. The three-dimensional simulator apparatus as defined in claim 5, wherein one of the type of information of texture and information specifying said type is changed when said display object enters from a first area into a second area, and wherein said first type of text information is mapped onto said display object when said display object moves on said first area, and said second type of texture information is mapped onto said display object when said display object moves on said second area.

8. The three-dimensional simulator apparatus as defined in claim 7, wherein one of the type of information of texture and information specifying said type is changed in steps in accordance with the distance traveled within said second area.

9. The three-dimensional simulator apparatus as defined in claim 4, wherein one of the type of information of texture and the information specifying said type is change in accordance with a surface state of a tire, said surface state of said tire being changed with simulation circumstances in which said tire contact with a road.

10. The three-dimensional simulator apparatus as defined in claim 4, wherein one of the type of information of texture and information specifying said type is changed when said display object enters from a first area into a second area, and wherein said first type of text information is mapped onto said display object when said display object moves on said first area, and said second type of texture information is mapped onto said display object when said display object moves on said second area.

11. The three-dimensional simulator apparatus as defined in claim 10, wherein one of the type of information of texture and information specifying said type is changed in steps in accordance with the distance traveled within said second area.

12. A three-dimensional simulator apparatus, comprising: means for storing object information that comprises at least object numbers and position information for display objects configuring a virtual three-dimensional (3D) space; virtual 3D space computation means for forming said virtual 3D space by setting said object information; object image information storage means for storing image information of objects specified by said object numbers; and image synthesis means for synthesizing a field-of-view image as seen from an observer based on said object information and said image information read out in accordance with said object numbers included in said object information;

wherein said image synthesis means comprises:

texture computation means for performing computations to map textures onto said display objects; texture information storage means for storing information of said textures to be mapped by said texture computation means, said texture information storage means for storing different types of texture information corresponding to the same display object;

said virtual 3D space computation means comprises:

changing means for changing at least one object number in accordance with a surface state of at least one display object specified by said at least one object number, said surface state being changed with simulation circumstances in which said at least one display object contacts with first and second display objects; and said object image information storage means stores said image information wherein information of a texture to be mapped onto an object that is specified by a pre-changing object number is different from information of a texture to be mapped onto an object that is specified by a post-changing object number;

wherein said texture information storage means stores a first type of texture information which represents a property of said first display object and a second type of texture information which represents a property of said second display object, and wherein said first type of texture information is used when said display object contacts with said first display object and said second type of texture information is used when said display object contacts with said second display object.

13. The three-dimensional simulator apparatus as defined in claim 12, wherein one of the type of information of texture and the information specifying said type is changed in accordance with a surface state of a tire, said surface state of said tire being changed with simulation circumstances in which said tire contacts with a road.

14. The three-dimensional simulator apparatus as defined in claim 12, wherein one of the type of information of texture and information specifying said type is changed when said display object enters from a first area into a second area, and wherein said first type of text information is mapped onto said display object when said display object moves on said first area, and said second type of texture information is mapped onto said display object when said display object moves on said second area.

15. The three-dimensional simulator apparatus as defined in claim 14, wherein one of the type of information of texture and information specifying said type is changed in steps in accordance with the distance traveled within said second area.

16. An image synthesis method for synthesizing a field-of-view image as seen from an observer within a virtual three-dimensional (3D) space configured of a plurality of display objects, comprising:

movement information computation step for computing at least one of a velocity and a rotational velocity of at least one of said display objects based on at least one of an operating signal input by said observer through control means and an instruction from a computer;

a texture computation step for performing computations to map textures onto said display objects using texture information storage means for storing different types of texture information corresponding to the same display object; and a changing step for changing one of a type of information of at least one texture to be mapped onto at least one of said display object and information specifying said type in accordance with at least one of said velocity and said rotational velocity of said at least one of said display objects;

wherein said at least one of said display objects moves or rotates with said texture being mapped onto said moving or rotating display object, and one of the type of information of texture and information specifying said type is changed in accordance with at least one of said velocity and rotational velocity of said moving or rotating display object, and wherein texture information for a stopped state is used when said display object stops, and same texture information is used when said display object moves or rotates at a low speed, and one of the type of information of texture and information specifying said type is changed when the display object moves or rotates at an intermediate speed.

17. An image synthesis method for synthesizing a field-of-view image as seen from an observer with a virtual three-dimensional (3D) space configured of a plurality of display objects, comprising:

a texture computation step for performing computations to map textures onto said display objects using texture information storage means for storing different types of texture information corresponding to the same display object; and a changing step for changing one of a type of information of at least one texture to be mapped onto at least one of said display objects and information specifying said one type in accordance with a surface state of said at least one display objects, said surface state being changed with simulation circumstances in which said at least one display object contacts with first and second display objects;

wherein said texture information storage means stores a first type of texture information which represents a property of said first display object and a second type of texture information which represents a property of said second display object, and wherein said first type of texture information is used when said display object contacts with said first display object and said second type of texture information is used when said display object contacts with said second display object.

18. The image synthesis method as defined in claim 17, wherein one of the type of information of texture and the information specifying said type is changed in accordance with a surface state of a tire, said surface state of said tire being changed with simulation circumstances in which said tire contacts with a road.

19. The three-dimensional simulator apparatus as defined in claim 17, wherein one of the type of information of texture and information specifying said type is changed when said display object enters from a first area into a second area, and wherein said first type of text information is mapped onto said display object when said display object moves on said first area, and said second type of texture information is mapped onto said display object when said display object moves on said second area.

20. The three-dimensional simulator apparatus as defined in claim 19, wherein one of the type of information of texture and information specifying said type is changed in steps in accordance with the distance traveled within said second area.

* * * * *